Dec. 3, 1963  A. L. M. A. ROUY  3,113,171
METHOD FOR POLARIMETRIC ANALYSIS
Filed Aug. 24, 1957  9 Sheets-Sheet 1

AUGUSTE LOUIS MARIE ANTOINE ROUY
INVENTOR.

BY
*Rudolph J. Gurick*
ATTORNEY

Dec. 3, 1963  A. L. M. A. ROUY  3,113,171
METHOD FOR POLARIMETRIC ANALYSIS
Filed Aug. 24, 1957  9 Sheets-Sheet 2

AUGUSTE LOUIS MARIE ANTOINE ROUY
INVENTOR.

BY
*Rudolph J. Junick.*
ATTORNEY

AUGUSTE LOUIS MARIE ANTOINE ROUY
INVENTOR.

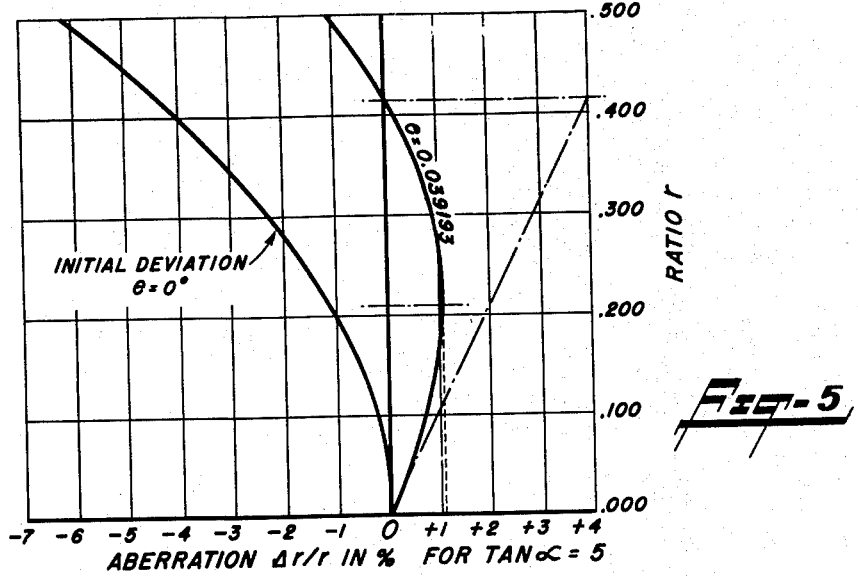
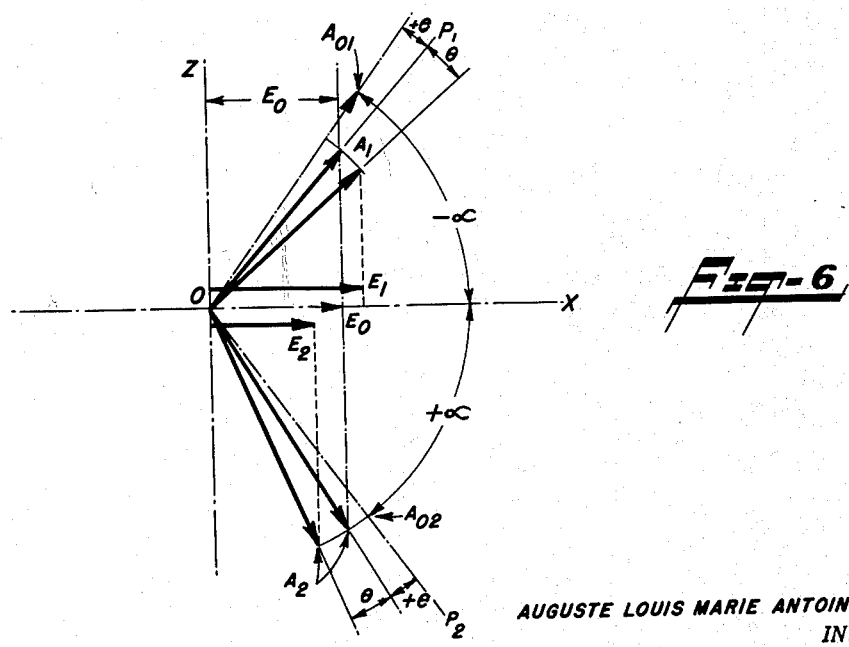

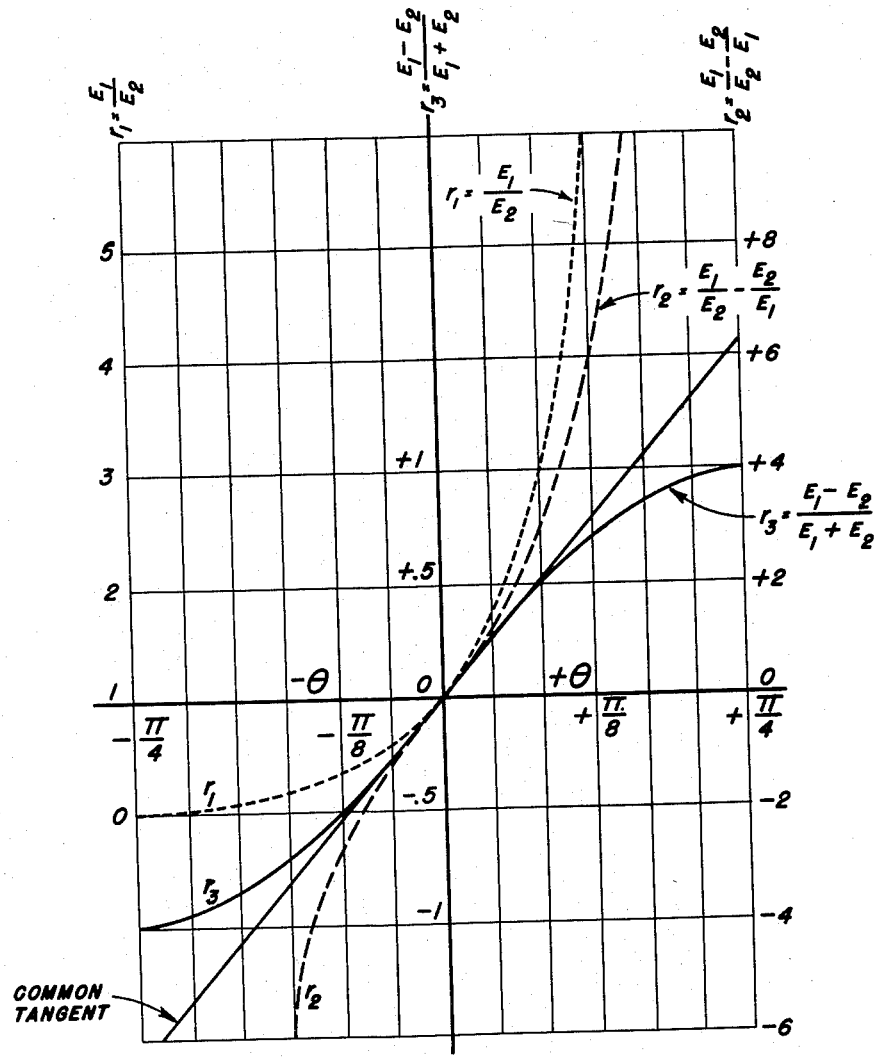

Dec. 3, 1963     A. L. M. A. ROUY     3,113,171
METHOD FOR POLARIMETRIC ANALYSIS
Filed Aug. 24, 1957     9 Sheets-Sheet 6
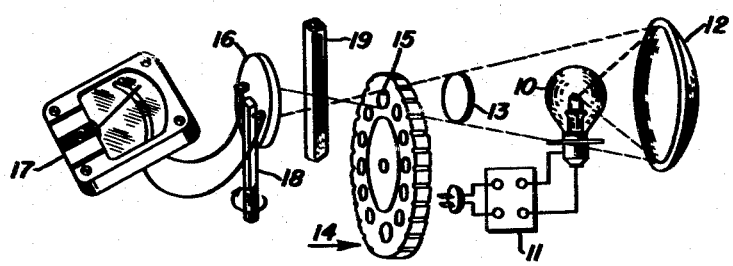
*Fig-8*
*Fig-10*
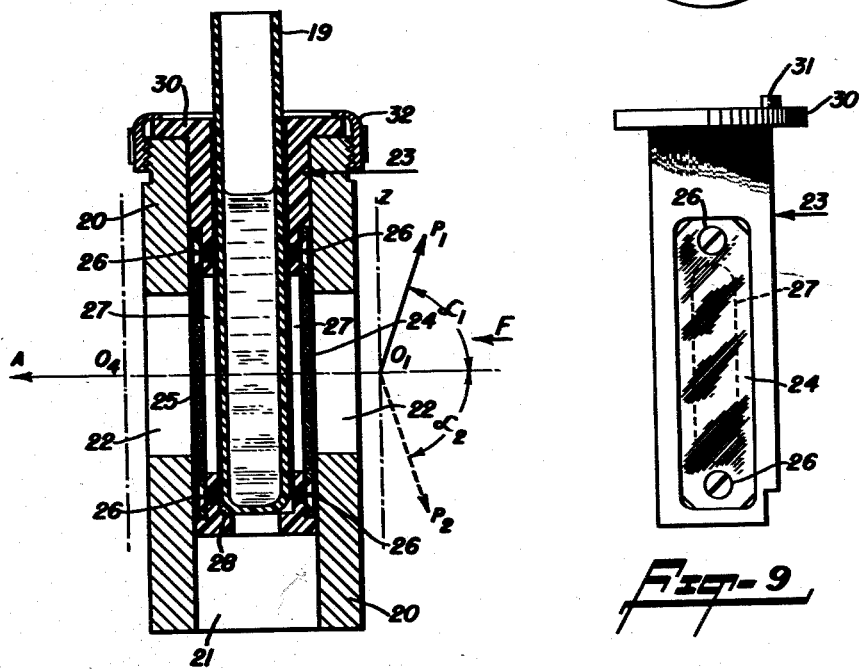
*Fig-11*
*Fig-9*
AUGUSTE LOUIS MARIE ANTOINE ROUY
INVENTOR.
BY
Rudolph J. Jeniak
ATTORNEY

AUGUSTE LOUIS MARIE ANTOINE ROUY
INVENTOR.

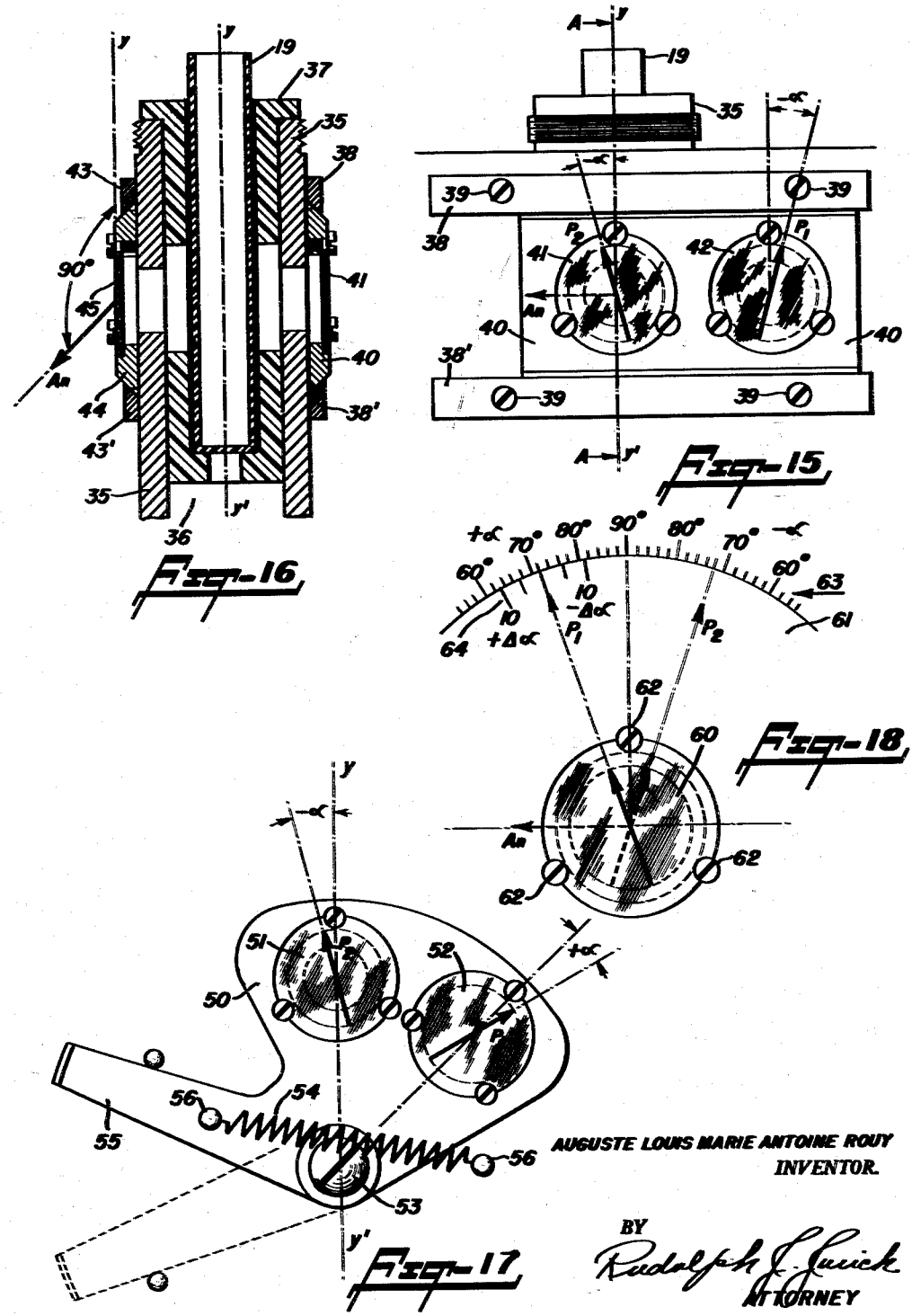

DISTORTED vs LINEAR INSTRUMENT SCALE
TAN∝ = 5.0

LINEAR METER SCALE

DISTORTED METER SCALE FOR TAN∝ = 5

United States Patent Office 3,113,171
Patented Dec. 3, 1963

3,113,171
METHOD FOR POLARIMETRIC ANALYSIS
Auguste Louis Marie Antoine Rouy, Scarsdale, N.Y., assignor, by mesne assignments, to Daystrom, Incorporated, Murray Hill, N.J., a corporation of Texas
Filed Apr. 24, 1957, Ser. No. 654,929
2 Claims. (Cl. 88—14)

This invention relates to polarimetric analysis and more particularly to a novel method for determining the magnitude of the angular rotation of the plane of polarization of a light beam by a substance, and apparatus suitable for the practice of the method.

The measurement of the angular rotation of a polarized light beam by a substance is of great importance since it permits the performance of qualitative and quantitative analysis in a convenient manner and yields valuable information relating to the structure of molecules. Various methods have heretofore been proposed for the measurement of such phenomenon. In general, the substance under test is inserted into a light beam between two light polarizing members, one such member being referred to as the polarizer and the other as the analyser. In one method, in general use, the analyser is rotated to cause a complete extinction of the light beam without the presence of the substance. The substance to be analysed is then placed into the light beam and the analyser again rotated to the point required for extinction of the light beam. The analyser is associated with an angular scale and reference mark whereby measurement of the angular rotation of the light beam by the substance is obtained. Obviously, the sensitivity, or precision of the system is limited by the capabilities and variations of the human eye. The sensitivity, or response, of the eye to light energy does not follow a linear function but, rather, approaches a logarithmic one and, hence, the exact angle of light extinction cannot be determined at a precision greater than the eye threshold of perception.

The need for higher accuracy and sensitivity, in this field, has resulted in the provision of various optical devices for splitting the field of vision to permit obtaining a balance of light intensities, which condition is more favorable for visual observation. While such systems offer the advantage of increased sensitivity they are rather complex, delicate and expensive.

In addition to the sensitivity and accuracy limitations of present methods of polarimetric analysis, the results obtained vary with the color and density of the substance under test and the results often are anomalous with respect to specific substances. So far as I am aware, all known methods impose serious restrictions in respect of the diagnostic value of the polarimetric method of analyses.

In its broad aspect, the present invention provides a simple, positive means for amplifying the extent of angular rotation of the plane of polarization of a light beam brought about by a substance interposed in such light beam. Further, the method proposed is most useful for performing polarimetric analyses on substances in the liquid, gas, vapor or solid form and irrespective of variations in color or density. Still further, the method inherently offers a degree of sensitivity and precision heretofore unattained.

An object of this invention is the provision of a method of polarimetric analysis which provides significantly improved results over known methods and which may be practiced with apparatus of a simple, rugged and inexpensive character.

An object of this invention is the provision of a method of polarimetric analysis which eliminates the factor of subjectivity, thereby affording a high degree of repetitive accuracy otherwise impossible to achieve.

An object of this invention is the provision of a novel method for determining the angular rotation of the plane of polarization of a light beam by a substance, which method comprises causing a polarized reference light beam to impinge upon the substance, said light beam having a known plane of polarization, passing the polarized light beam which emerges from the substance through a light polarizing member which member has its plane of polarization oriented at a predetermined angle relative to the plane of polarization of the reference light beam, measuring the relative energy of the light beam emerging from the said light polarizing medium, changing the angle between the plane of polarization of the reference light beam and that of the light polarizing member, and again measuring the relative energy of the light beam emerging from the light polarizing member, the relative magnitudes of the stated light energies being taken as indicative of the angular rotation of the polarized light beam by the substance.

An object of this invention is the provision of a precise method of polarimetric analysis, which method comprises passing a light beam through a polarizer and an analyser spaced therefrom, said polarizer and analyser having their planes of polarization forming an angle $\alpha$, interposing a substance under test into the path of the light beam passing from the polarizer to the analyser, measuring the relative energy of the light beam emerging from the analyser, changing the plane of polarization of the polarizer to form an angle $-\alpha$ with that of the analyser, and again measuring the relative energy of the light beam emerging from the analyser; the relative magnitudes of the measured light energy values being taken as indicative of the angular rotation of the light beam by the substance under test.

An object of this invention is the provision of a method for determining the angular rotation of the plane of polarization of a light beam by a substance, which method comprises passing a light beam of constant amplitude through a polarizer and an analyser and onto a light transducer, said polarizer and analyser having their planes of polarization oriented to form an angle $\alpha$; inserting the substance into the light beam between the polariser and the analyser; measuring the output of the transdudcer; changing the angle between the planes of polarization of the polarizer and analyser to $-\alpha$; and again measuring the output of the transducer; the relative magnitudes of the two outputs of the transducer being taken as indicative of the angular rotation of the polarized light beam by the substance.

These and other objects and advantages will become apparent from the following description when taken with the accompanying drawings. It will be understood, however, that the drawings are for purposes of illustration and are not to be construed as defininig the scope or limits of the invention, reference being had for the latter purpose to the appended claims.

In the drawings wherein like numerals identify like parts in the several views:

FIGURE 5 is a graph showing two curves illustrating the correction of the aberration, or error function, in accordance with the practice of this invention;

FIGURE 6 is a vectorial diagram presenting the effects on the light energy measurements by the introduction of a predetermined deviation angle on the initial phase angle between the analyser and polarizer;

FIGURE 7 is a graph showing the response curves for the three methods of polarimetric analysis disclosed herein;

FIGURE 8 is a diagrammatic representation of a photoelectric colorimeter useful for the practice of my novel methods of polarimetric analysis;

FIGURE 9 is an elevation showing the construction of an adapter which carries the polarizer and analyser;

FIGURE 10 is a top view thereof;

FIGURE 11 is a central, vertical, cross-sectional view showing the adapter and test tube positioned in operative relationship in a suitable holder;

FIGURE 15 is a side elevation showing another embodiment of the polarizer-analyser arrangement;

FIGURE 16 is a vertical section taken above the line A—A of FIGURE 15;

FIGURE 17 is a fragmentary, side elevation showing still another embodiment of the polarizer-analyser arrangement;

FIGURE 18 is a fragmentary elevational view showing an arrangement utilizing a single polarizer;

BACKGROUND—OPTICAL ROTATION

Figure 1:
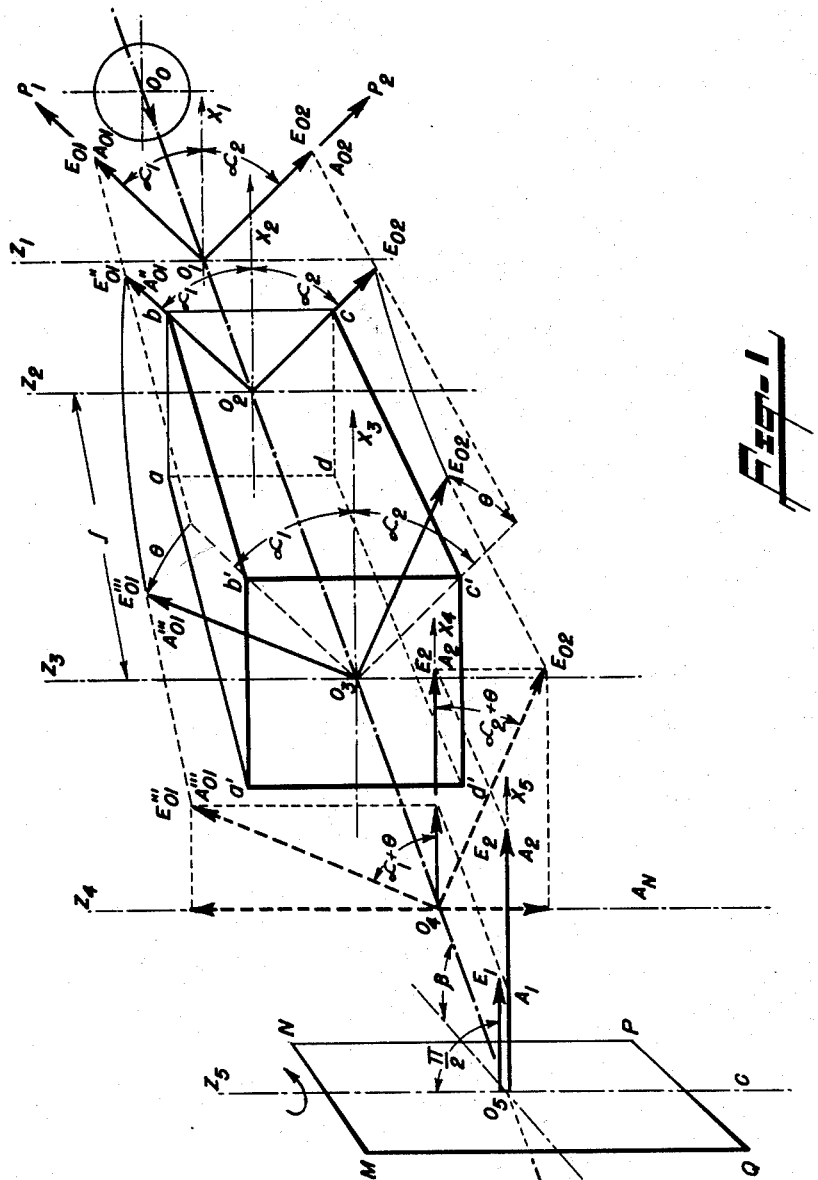
FIGURE 1 is a diagrammatic representation for developing the equations representing the physical behavior of a light beam traversing a polarimeter arrangement in accordance with this invention.

It is known that certain chemical substances exhibit to greater or lesser degree the property of rotating the plane of polarization of a light beam traversing through the substance. The lack of symmetry in the structure of the molecule causes the observed optical activity which generally is referred to as optical rotation, a characteristic which, however, is not to be confused with the optical activity resulting from anisotropic crystalline structure. The optical rotation here referred to, and forming a basis for the practice of this invention, is, per se, strictly related to the amorphous state of the chemical compound.

Since the magnitude of the angular rotation of the plane of polarization contributed by a molecule, be it levogyre or dextrogyre, depends upon the degree of the asymmetry present in the molecular structure, the extent of such angular rotation provides a means for qualitative as well as quantitative analyses. Further, because of the relative position of one or several atoms, or of one or several groups of atoms, in the molecular structure governs the degree of asymmetry and its relative sign, the measurement of the angle of rotation of the plane of polarization yields a positive identification if isomeric chemicals which could not otherwise be differentiated. The four pentose sugars offer a typical example of such possible distinction between isomeric substances while furnishing the necessary basis to the optical superposition principle proposed by J. H. Van't Hoff in 1894. This principle, however, is not sufficient in itself to account for all of the observed facts.

The optical rotation resulting from a molecular asymmetry can be observed in the different forms of solid, gas, or liquid in either the pure state or in solutions. On the other hand, substances which normally are inactive while in the amorphous form, may exhibit optical activity in the crystalline state wherein the rotation of the plane of polarization is produced as a consequence of the arrangement of the constitutive atom grouping, forming either a right handed or left handed spiral. Upon melting of such active crystals, their molecular pattern vanishes, and so does the optical activity.

The observed and measured optical activity corresponds to the additive effects of each molecule encountered by a single ray of polarized light passing through the active substance in its amorphous state. In this state, however, there exists no preferential orientation of the molecules, since a random distribution prevails in the absence of any orienting external field of force. For this reason, and by reason of the fact that experimental methods of measurement cannot be designed to single out one and only one molecule, the specific optical rotation $[\alpha]$ is given in terms of a definite length of the light path, the density of the substance and the weight fraction of the active chemical in the solution.

Hence, the specific angular rotation $[\alpha]$ is related to the observed angular rotation $\alpha$ by the relationship:

$$[\alpha]=\frac{\alpha}{l\rho}$$

for pure substances, and $$[\alpha]=\frac{\alpha}{l\rho f}$$

for solutions where:

$l=$ a definite length of the light path through the solution, expressed in decimeters,
$\rho=$ the density of the substance, and
$f=$ the weight fraction of the active chemical in the solution of density $\delta$.

Also, the molecular rotation or molecular rotary power $[M]$ of a substance expresses the product of the specific angular rotation $[\alpha]$ multiplied by the molecular weight $M$ and divided by 100, that is, $$[M]=M\frac{[\alpha]}{100}$$

The above equations are well known and most of the coefficients involved are found in the International Critical Tables, volumes II and VII.

A solvent acts upon the rotating power of a substance in a rather complex manner. However, it suffices to state here, that for closely related solvents, it has been found that the optical rotation of a chemical in solution decreases when the polarity of the solvent increases. Temperature also may act to a greater or lesser degree and, consequently, the optical rotation of a substance generally is defined at a given temperature, as, for example, $[\alpha]^{20}$.

In his study of the optical rotation produced by asymmetrical compounds, J. B. Biot (1817) discovered that the rotating power was dependent on the wave length of the polarized light and he, therefore, proposed the following relationship:

$$[\alpha]_\lambda=\frac{A}{\lambda^2}$$

where:

$A=$ a constant specific to the chemical, and
$\lambda=$ the wave length of the light passing through the substance.

The Biot formula also falls short of accounting for all factors involved and probbaly was the result of incomplete experimentation or poor accuracy in measurements.

The exact mechanism or action involved in the variation of the optical rotation with variations in the wave length of the polarized light is not exactly known and is often referred to in the literature as the dispersion of the rotating power. However, following his studies on the subject in 1825, A. J. Fresnel proposed a generally satisfactory explanation. Fresnel assumed that the polarization of the light in one direction represents the resultant of two circularly polarized light rays of equal amplitudes and rotating in opposite directions at equal angular velocities. Hence, when these two rays penetrate an optically active substance, they travel within the substance at velocities that are respectively accounted for by the right and left handed indices of refraction. Thus, the observed phase angle variation per unit distance becomes related to the wave length by the relationship:

$$\alpha = \frac{\pi}{\lambda}(n_e - n_r)$$

where $n_e$ and $n_r$ are the relative values of the refraction indices for dextrogyre and levogyre direction, respectively.

The work of J. B. Biot was revised by P. Drude in 1900, who established his well known and accepted formula:

$$[\alpha] = \frac{k_1}{\lambda^2 - \lambda_1^2} + \frac{k_2}{\lambda^2 - \lambda_2^2} + \frac{k_3}{\lambda^2 - \lambda_3^2}$$

in which $k_1$, $k_2$, $k_3$, and $\lambda_1$, $\lambda_2$, $\lambda_3$ and $\lambda$ are constants. The constants $\lambda$ possess physical significance, being closely related to the wave lengths of the heads of the absorption bands. When the dispersion of a substance is fully accounted for by a single Drude's term it is said to be simple rotary dispersion. Two or more Drude's terms lead to complex rotary dispersion, while if the sign of one term is different from the signs of the others, the dispersion becomes anomalous. Such anomalous dispersion appears characterized by a minimum, maximum, or a point of inflection in the graph representative of the dispersion factor as a function of the wave length. The Drude's equation does not apply in the vicinity of an absorption band, probably because of the broadness of the band. For example, it is known that the dispersion increases, considerably in the vicinity of the sodium "D" line when polarized light passes through sodium vapor.

When a substance is colored, it becomes quite difficult to measure the optical activity of its particles. Such substance, in one of the mechanisms, is known as the A. Cotton's effect (1896), may preferentially absorb one of the two circularly polarized vibrations whose vectorial sum normally forms the linearly polarized vibration. With one of the components so decreasing in magnitude, the resulting vibration is no longer linear, but becomes elliptically polarized, such phenomenon generally being referred to as circular dichroism. Also, the optical rotation of a substance decreases when the wave length of the light approaches the wave length of a principal band of absorption and reaches zero near the head of the band. Upon further variation of the wave length, in the same direction, the optical rotation increases again in absolute value but with a change in sign. The wave length corresponding to the point of inflection represents also the Drude's constant $k$.

Substances which normally are optically inactive under normal conditions, may become active when subjected to a magnetic field. This characteristic was first observed by Faraday, and later studied by M. Verdet (1858) who developed his well known equation:

$$\alpha = \delta l H \cos \theta$$

where:

$\alpha$ = the observed optical rotation,
$\delta$ = Verdet's constant,
$l$ = the length of the light path through the substance in cm.,
$H$ = the intensity of the magnetic field, in gauss,
$\theta$ = the angle between the direction of the magnetic field and the direction of the light.

For water, the Verdet's constant measured at 20° C. reaches 0.013 08 minutes of arc for the sodium "D" line. Although the Verdet's constant is practically independent of temperature, it varies greatly with the wave length of the light.

W. H. Perkins (1884–1907), in his investigations of the magnetic rotary power, used water as a standard and defined the molecular magnetic rotation [M] by the relationship:

$$[M] = \frac{M\alpha\rho'}{M'\alpha'\rho}$$

where M is the molecular weight of the solution, $\alpha$ is the angle of rotation of the solution, $\rho$ is the density of the solution, and M', $\alpha'$ and $\rho'$ are the same quantities for water.

Of more importance, Perkins has shown that for the magnetic rotation in any homogeneous series, the following relationship holds true:

$$[M] = 1.023n + s$$

where:

$n$ = the number of $CH_2$ groups, and
$s$ = a constant for a given series.

From the series constants, optical rotation equivalents may be computed for different atoms, thus yielding, for instance:

| | | | |
|---|---|---|---|
| Hydrogen | 0.254 | Carbon | 0.515 |
| Chlorine | 1.734 | Oxygen in —OH | 0.191 |
| Bromine | 3.562 | Oxygen in —CHO | 0.261 |
| Iodine | 7.757 | Double bond | 1.11 |

Thus, the study and measurement of optical rotary power and molecular magnetic rotation have far reaching consequences. Through them, qualitative and quantitative analysis are performed easily and yield also precious information as to the intimate structure of the molecules. Polarimetric analysis, in this respect, goes beyond spectrographic analysis which is generally limited to the determination of the relative percentage of the chemical constituents entering into the composition of a complex molecule. However, polarimetric analysis cannot always be substituted for spectrometric or colorimetric methods of analysis because these last ones may be found either more sensitive in respect to traces of the elements or more specific for a given compound.

BACKGROUND—POLARIMETRY INSTRUMENTATION

The angle of optical rotation of a substance can be measured by means of simple instrumentation. Basically, a polarizer, either Nicol's prism or simple polarizing film, is placed in a light beam emitted by a light source, monochromatic or not. Then an analyser, Nicol's prism or polarizing film, is introduced in the same beam after the polarizer in the direction of propagation of the light. A sufficient distance separates the polarizer and analyser to permit the interposition of the optically active chemical in the solid, liquid or gaseous form; the two last forms in appropriate transparent vessels to define a measurable length of the light path through the medium.

Without the presence of the optically active material in the light beam, hte analyser is rotated until complete extinction of the light is effected beyond the analyser. At that point, the plane of polarization of the analyser makes an exact 90° angle with the plane of polarization of the polarizer. The analyser carries an angular scale or protractor which, in combination with an adjustable reference marker, permits the measurement of angular rotations.

When complete extinction of the light, passing through both polarizer and analyser, has been obtained, the reference marker is brought in coincidence with the zero of the angular scale. Thus, the introduction in the light path of the optically active substance causes the light to appear again. The angular rotation through the active medium becomes that angle of rotation of the analyser necessary to obtain again complete extinction of the light. The rotation of the analyser may be either clockwise or counter-clockwise when looking toward the light source. In this condition, the clockwise rotation is said to be positive while the counter-clockwise is said to be negative rotation. The angular displacement, which is read off the scale graduation in coincidence with the reference marker, measures the optical rotation produced by the optically active substance.

The addition of a vernier arrangement to the protractor improves the precision and the sensitivity of the readings. Mechanical and optical refinements in the construction of the angular protractor could, for instance, with the use of extremely fine divisions observed through a 100 magnification microscope fitted with a spiraloid or micrometric ocular reticle, bring the sensitivity to the order of the second of an arc. Unfortunately, such mechano-optical arrangement, forgetting its high cost, does not improve the observed final precision of the systems; the human eye indeed limits it rather considerably.

The sensitivity or response of the human eye to light energy does not follow a linear function but closely approaches a logarithmic one. Although the range of visual perception spans an enormous variation of light energy, some 13 stilbs, it remains that the discriminating power of the eye seldom exceeds 2% at the most suitable energy level. The exact angle of extinction cannot be determined at a precision superior to that level represented by the eye threshold of perception. Beyond this limit, the instrumentation seems to be effected by the well known dead zone effect corresponding to a state of indifferent equilibrium.

The need for higher accuracy has resulted in the provision of several optical devices whose prime object is to enforce or magnify an existing difference so that the eye performs its discriminating function under more favorable conditions.

The improvements made over the basic polarimeter principle are represented by the now classical end point devices: Jellet-Cornu's split prism, Lippich's end point device, Laurent's half wave plate or the Quartz-wedge compensator mounted on saccharimeters.

All of these devices, which, incidentally, permit an angular accuracy of ±0.01° approximately, or ±36 seconds of an arc, replace the setting of the analyser at complete light extinction by a setting at equal illumination of the field of vision which is more favorable for visual observation.

The Jellet-Cornu, Lippich and Laurent systems embody the splitting of the field of vision in two or even three zones. Each zone receives a beam of polarized light whose respective axis of polarization differs from the other by a few degrees in angular position. After traversing the optically active substance the direction of the polarized vibration, in each light beam, is rotated by the same angular amount without change in their relative original angular phasing. Thus, upon rotating the analyser in the proper direction, there comes an angular position at which the analyser axis of polarization makes equal angles with the two directions of the entering rays. At this point, the field appears as evenly illuminated, and a slight angular deviation from such equilibrium position causes a rapid darkening of one zone while the other becomes far brighter.

A brief mathematical analysis is in order at this stage.

Let the two equal amplitude vectors produced by the polarizing system be represented by $A_0$. Their angular position reckoned from a given axis of reference takes respectively the values:

$$\theta + \epsilon_1 \text{ and } \theta + \epsilon_2$$

The angular quantities $\epsilon_1$ and $\epsilon_2$ denote their relative phase angle $\epsilon_2 - \epsilon_1$. Passing through the active substance both vectors rotate by the same angular displacement $\alpha$ and enter the analyser whose plane of polarization makes the angle $\beta$ with the axis of reference. At their emergence from the analyser, the rays amplitudes are equal to the projection of the entering amplitude onto the analyser axis of polarization, therefore, the emerging amplitudes are given by:

$$A_1 = A_0 \cos(\theta + \epsilon_1 + \alpha - \beta) \text{ and } A_2 = A_0 \cos(\theta + \epsilon_2 + \alpha - \beta)$$

Hence, the corresponding energies detected by the eye, being proportional to the square of the amplitudes, takes the form:

$$W_1 = A_0^2 \cos^2(\theta + \epsilon_1 + \alpha - \beta) \text{ and}$$
$$W_2 = A_0^2 \cos^2(\theta + \epsilon_2 + \alpha - \beta)$$

at equal illumination $W_1 = W_2$.

This relationship implies that $$\cos 2(\theta + \epsilon_1 + \alpha - \beta) = \cos 2(\theta + \epsilon_2 + \alpha - \beta)$$

holds true and this occurs for the only condition of interest, namely, $$\epsilon_1 = \epsilon_2$$

Hence, the relationship $\epsilon_1 = \epsilon_2 = \epsilon$ may be written, expressing that one of the vectors lags behind the angular position $\theta$ by the angle $\epsilon$ while the other precedes it by the same amount.

Also, the development of the equality to the cosines yields:

$$2 \sin 2(\theta + \alpha - \beta) \sin 2\epsilon = 0$$

which cannot be satisfied, since $\epsilon$ differs from zero, unless:

$$\theta + \alpha - \beta = (2k+1) \times \frac{\pi}{2}$$

is obtained. This last relationship indicates that the analyser must be crossed with the mean angular direction of the two rays.

The uniformity of the field illumination is ascertained by the eye within its limit of differentiation found to be of the order of 2% of the light energy. Hence, the condition of equal illumination added to the visual differentiation uncertainty validate the differential relationship:

$$dW \times A_0^2 \cos^2(\gamma - \epsilon) = 2A_0^2$$
$$[\cos(\gamma - \epsilon) \sin(\gamma - \epsilon) - \cos(\gamma + \epsilon) \sin(\gamma + \epsilon)] d\gamma$$

with $\gamma = \theta + \alpha - \beta$ for writing convenience.

From the requirement for $$\gamma = (2k+1) \times \frac{\pi}{2}$$

the following equally $\cos(\gamma + \epsilon) = -\cos(\gamma - \epsilon)$ is derived, leading to:

$$d\gamma = \frac{dW}{4} \tan \epsilon$$

We can express the precision of the analyser angular position, both as a function of the phase angle introduced by the polarizing system and the uncertainty of the visual perception $dW$, as follows:

Making the angle $\epsilon$ equal to 2.5 degrees while $dW = 0.02$ the final accuracy reaches $$d\gamma = 0.02 \times 0.045 \times \frac{1}{4} = 2.25 \times 10^{-4}$$

which is close to three quarters of a minute of arc approximately or ±45 seconds.

Although a smaller angle $\epsilon$ could be selected to decrease the angular uncertainty $d\gamma$, it is to be remembered that the light energy emerging from the analyser is given by:

$$W_e = A_0^2 \cos^2(\gamma \pm \epsilon) = A_0^2 \cos^2\left(\frac{\pi}{2} \pm \epsilon\right)$$

or close to $$W_e = A_0^2 \sin^2 \epsilon = 0.002 A_0^2$$

This equivalent 2 parts per 1000 transmission is already extremely difficult to manage even with the most brilliant light source.

This analysis has the merit to exactly depict the basic functioning of the cited instruments. The computed uncertainty of $\pm 45$ seconds checks very well with the claimed accuracy of $\pm 36$ seconds.

As already pointed out hereinabove, the three classical polarimeters differ among themselves by the construction of their polarizers which produce the two light beams at a relative angular displacement.

In the Jellet-Cornu's polarizer, the polarizing Nicol prism is cut in two halves along the optical axial plane. After grinding away from each part equal wedge shaped sections making an angle of 2.5° the two elements are cemented again together. Each section polarizes the light traversing them in a plane making an angle of five degrees with the other one. The phase angle is fixed by construction accounting for its unvariable sensitivity and the system is quite rugged.

In Lippich's polarizer, the arrangement includes a fixed, large Nicol prism covering the whole field and a small Nicol prism, in series with the large one, covering only one part of the field. This auxiliary Nicol prism can be orientated at will to polarize the light plane making a small angle with the main plane of polarization. A refinement of the system consists in interposing two small Nicol prisms with their plane of polarization parallel to each other. The field of vision becomes, therefore, divided in three sections, the central one, corresponding to the main plane of polarization, while the two outer ones belong to the angularly shifted plane. The observation of the field is somewhat facilitated.

The Lippich's system has the advantage of variable sensitivity but its construction is quite delicate, and the edges of the small prisms become etched with time.

In Laurent's polarizer, the angular shift of the plane of polarization is produced by means of a one-half wave length, sodium D line, retarding quartz plate. This plate, cut parallel to the axis of the crystal, is placed after the polarizing Nicol prism and covers half of the field. The vector amplitude emerging from the quartz plate being the vectorial sum of the fast and slow rays becomes shifted from the incident angular position by twice the amount of the angle made by the Nicol prism plane of polarization with the optical axis of the quartz plate. This variable phase angle device functions only for the monochromatic wave length for which it has been designed.

The quartz-wedge compensator dispenses with the necessity of using monochromatic light. On account of the rotary dispersion effect, the different light wave lengths are rotated by variable amounts by an optically active chemical. To eliminate the difficulty of observation, a material is selected which possesses a rotary dispersion equal but opposite in sign to the rotary dispersion of the active chemical. It has been found that a plate of levo-quartz, cut perpendicular to its optical axis, has a dispersion very nearly equal and opposite in sign to the cane sugar dispersion. This property is used in the Soleil quartz-wedge compensator. A dextro rotating quartz plate is placed ahead of a wedge combination of levo rotating quartz plates. The movable levo-quartz wedge translates to obtain the cancellation of the dispersion by variation of the thickness of the levo-wedge plates combination. Measurement of the necessary translation yields the amount of rotation produced by the active material.

A present method for measuring the angular optical rotation of a substance in a transparent active medium is that proposed by Crumpler. In the Crumpler system, a light beam is passed through a first light polarizing medium (polarizer) and then through the optically active substance under investigation. As the polarized light beam traverses the substance, its plane of polarization is rotated by an angle $\theta$. Upon emergence from the substance, the light beam is passed through a second light-polarizing medium (analyser), said analyser having its plane of polarization oriented at an angle of 45 degrees relative to that of the polarizer. The light beam emerging from the analyser is measured by means of a suitable light transducer which converts light energy to electrical energy. However, the active substance placed between the polarizer and analyser absorbs some of the light energy. Consequently, the energy measured by means of the light transducer differs from that entering the substance by two factors, namely, the absorption factor and the optical rotation of the substance. Thus, by a single measurement, it is impossible to dissociate these two factors in their joint effect on the measured light energy. Crumpler's method, then, requires a measurement of the absorption factor separately from the optical rotation. For this purpose, the analyser is positioned adjacent the polarizer with the active substance removed from the light beam and a measurement is made of the light energy emerging from the analyser. Next, the substance is placed into the light beam between the analyser and the light transducer and a second measurement is made of the light energy emerging from the analyser. The second measurement is not affected by the optical rotation of the substance, since the substance is disposed between the analyser and the light transducer. Then a third measurement is made with the substance disposed between the polarizer and the analyser. Thus, through three different operations, two of which are performed under fixed conditions of standardization, and which are related to each other by a fixed constant (the phase angle between polarizer and analyser) the angle of optical rotation of the substance can be determined.

The Crumpler method has several disadvantages. The arbitrary selection of a phase angle of 45 degrees between the polarizer and analyser seriously limits the sensitivity of the method. Further, the requirement for displacing the analyser cannot meet the required condition of high accuracy in angular positioning in a practical sense, it being known that the phase angle between the polarizer and analyser must be respected to better than 0.00003 radian. Still further, the method cannot be used with substances which exhibit dichroism, or the Cotton effect. Also, because of low sensitivity, the light path through the substance must be fairly long, approximately 10 centimeters, and the amount of light energy emerging from such sample of the solution is very small.

THE INVENTION—BASIC APPROACH

The study of the different types of classical polarimeters indicates that in spite of all optical and mechanical refinements they remain limited in their accuracy and thus in their usefulness by the fact that the measurement of optical rotations still depends on subjective appreciation.

It is logical to envision the use of light sensitive transducers, in replacement of the eye, to eliminate the personal error and achieve instantaneous reading of greater accuracy while seeking an overall simplification of the instrumentation. The modern scientific or control instrument, to achieve its object and purpose, must be simple, rugged, sensitive, unwavering in its indications and yet not expensive. The present economics point out the necessity for measurement and control instrumentation which can be operated by unskilled workers in the minimum of time and for automatic control, recording or monitoring, of continuous flow process. Above all, the instrumentation must be designed around a specific physical principle properly applied with the minimum amount of apparatus.

If, then, the visual observation of the variable illumination of the field of a polarimeter is replaced by the measurement of the light energy emerging from the analyser by means of a light transducer device, the subjectivity of the method disappears.

But this substitution by itself, even with the additive condition of linear response to light energies, does not warrant the conclusion that the system will operate properly. Polarimetry not only involves magnitudes of energy levels but also, and this with pre-eminence, their vectorial nature, which imposes conditions and restrictions on both instrument design and method of measurement.

In this case, as in many others, one cannot dispense with mathematical analysis to study the behavior of the system and its different characteristics.

In a polarizer-analyser combination, with or without the interposition of an optically active medium, primordial consideration must be given to the fact that the measurable light energy, emerging from the analyser, represents a function of two independent variables, namely, the amplitude and the angular position of a polarized vibration. Amplitude and angle may or may not be interrelated to each other. Also, the energy associated with a harmonic motion, being at any instant the sum of its kinetic and potential energy, becomes proportional to the square of the maximum amplitude.

However, in accordance with the Maxwellian theory of light propagation, that component alone of the polarized vibration vector which is in phase with the direction of the plane of polarization set up by refraction or reflection, will be found in the either refracted or reflected rays. This is equivalent to stating that the light energy emerging from an analyser is proportional to the square of the projection of the entering or impinging vibration amplitude vector onto the direction of the plane of polarization of the said analyser.

In order to facilitate a proper understanding of the equations developed hereinbelow, I here point out the following relationships:

$E$=energy impinging on the light transducer,
$A$=maximum amplitude of the energy striking the analyser,
$\theta$=angle between the energy striking the analyser and the analyser plane of polarization,
$e$=2.718 (base of common logarithm),
$k$=coefficient of absorption of medium,
$c$=concentration of the absorbing medium,
$l$=distance traveled through the optically active medium in cm.
$\rho$=density of the active substance or a solution of it,
$f$=weight fraction of the active substance in solution, and
$[\alpha]$=specific angular rotation in degrees.

Now, the measureable energy (E) as detected by the light transducer may be expressed as:

$$E = A^2 \cos^2 \theta \qquad (1)$$

In this relationship, the product of the maximum amplitude A, of the entering linearly polarized vibration, and the cosine of the angle $\theta$ that its direction makes with the direction of the analyser plane of polarization, expresses the magnitude of the vibration component along this said analyser plane.

Taking the differential of this equation, one obtains:

$$dE = A(1 + \cos 2\theta_0)dA - A^2 \sin 2\theta_0 d\theta \qquad (2)$$

which indicates that a variation $dE$ of the transmitted energy E cannot be positively attributed to either one of the two possible variations, unless a specific condition has been initially set up. Naturally, if the amplitude A can be made a constant entirely independent from the angle $\theta$, the variation, $dE$ becomes representative of the angular variation $d\theta$ which, in this case, must be associated to the optical activity of the substance.

The condition for correspondence of the energy measurement to the angle cannot be ascertained unless the complete equation representing the physical behavior of a light beam traversing a polarimeter arrangement is correctly established and discussed.

Reference is now made to FIGURE 1. Here a ray of light, emitted by a source, travels in the general direction from ($O_0$) to ($O_5$) and in so doing, enters and passes at the point ($O_1$) through a polarizer whose axis of polarization ($P_1$) makes an angle ($\alpha_1$) with a selected axis of reference ($O_1X_1$) of the front plane ($Z_1O_1X_1$) perpendicular to the direction of propagation.

The energy ($E_{01}$) of the light beam after polarization is given by:

$$E_{01} = \frac{E_0}{2} = A_{01}^2 \qquad (3)$$

where $E_0$ in the absence of absorption, represents the total energy of the entering ray and $A_{01}$ the polarized ray amplitude vector making the angle ($\alpha_1$) with the reference axis ($O_1X_1$).

The light ray then penetrates the optically active medium at the front plane ($Z_2O_2X_2$) and travels through it a distance ($l$) before emerging at the frontal plane ($Z_3O_3X_3$). During the passage through the active substance, represented by the prismatic volume ($abcd, a'b'c'd'$) the direction of the amplitude vector progressively rotates by the angle $\theta$ while part of the light energy may be absorbed. Therefore, the physical state of the light beam emerging from the optically active medium is fully determined by $$E'''_{01} = {}_{01}e^{-klc} = A_{01}^2 e^{-klc} = A'''_{01}{}^2 \qquad (4)$$

and the angle $\theta + \alpha_1$, made by the amplitude vector ($A'''_{01}$) with the axis of reference ($O_3X_3$) parallel to ($O_1X_1$).

The polarized light ray must now traverse at the plane ($Z_4O_4X_4$), the analyser which passes only the vectorial component in phase with its own axis of polarization. Thus, at that stage, the emerging ray becomes characterized by an amplitude:

$$A = A'''_{01} \cos (\theta - \alpha_1 - \beta) \qquad (5)$$

if $\beta$ is the angle ($O_1X_1$) made by the axis of polarization of the analyser and polarizer.

Hence, the light transducer element located in the plane ($Z_5O_5X_5$) senses the energy $E_1$:

$$E_1 = A_1^2 = A_{01}^2 e^{-klc} \cos^2 (\theta + \alpha_1 - \beta) \qquad (6)$$

in which the angular optical rotation $\theta$ is given by:

$$\theta = [\alpha] \rho l f \qquad (7)$$

In the above equations, the absorption has been written as if this term was solely dependent upon one variable although both solvent and solute may be not only colored, but of different colors. Consequently, to this point it must be understood that the absorption factor is considered as the resultant absorption of both the solute and the solvent. In fact, the exponent of the absorption function is the sum of the relative cofficients of absorption of each medium successively traversed by the light beam.

The relationship expressed in Equation 6 above, describes the mechanism of light energy measurement by a transducer element when a light beam impinges on its sensitive surface after traversing a polarizer-analyser system including an intermediate optically active medium.

The transducer output is proportional to the product of three main terms; the amplitude (A) of the harmonic oscillation, the cosine of the angle made by the vector amplitude with the axis of the analyser and the absorption coefficient. Operating in accordance with this relationship, the furnished indications are of very limited value; they are not specific of the optical rotation. Further, the output is predominantly governed by the angle $(\alpha_1-\beta)$ made by the analyser and polarizer axes of polarization; $\alpha_1$ being the angle made between the polarizer axis of reference and $\beta$ being the angle made between the axis of the analyser and the same reference axis. The optical rotation angle $\theta$ being small, the transducer output may pass from 0 to a maximum value depending upon the angular value of $(\alpha_1-\beta)$.

By taking the total differential of the light emerging energy function with respect to the different variables, some valuable information may be gained. This total differential:

$$dE_1 = 2A_{01}e^{-klc}\cos^2(\theta+\alpha_1-\beta)$$
$$dA_{01} - A^2_{01}e^{-klc}\cos^2(\theta+\alpha_1-\beta)kldc$$
$$-A^2_{01}e^{klc}\sin 2(\theta+\alpha_1-\beta)[d\theta+d(\alpha_1-\beta)] \quad (8)$$

furnishes some important information.

The absolute sensitivity of the measurement increases with the amplitude $(A_{01})$ of the polarized vibration and decreases when the absorption increases. But, this same absolute sensitivity, in respect of the optical rotation, may vary from zero to a maximum depending upon the angle $2(\theta+\alpha_1-\beta)$.

For the equality:

$$2(\theta+\alpha_1-\beta) = k\pi \text{ or } (\theta+\alpha_1-\beta) = k\frac{\pi}{2}$$

$$\text{with } k=0, 1, 2 \ldots \quad (9)$$

the function $\Delta E_1/\Delta\theta = 0$ thus bringing the sensitivity in respect of $d\theta$ to zero. The disappearance of this sensitivity occurs for both maximum and minimum of $\cos(\theta+\alpha_1-\beta)$.

Of great importance is the fact that for those angles, the variation of the light output is independent of the sign of the optical rotation variation. The system then cannot differentiate between levogyre and dextrogyre rotation.

Considering the case where:

$$2(\theta+\alpha_1-\beta) = (2K+1)\frac{\pi}{2} \quad (10)$$

one obtains a maximum for the absolute sensitivity in respect of the optical rotation. What is more, the variation of the light output is discriminative of the sign of the optical activity which is a requisite condition for the instrumentation.

The system achieves practicability under certain conditions. For this purpose, the amplitude of the polarized oscillation must be maintained constant by an adequate regulation of the light source emission.

To benefit from the maximum absolute sensitivity as a function of the optical rotation, the angle $(\theta+\alpha_1-\beta)$ must be selected as being an odd multiple of 45°. In doing so the instrumentation detects either the absolute magnitude of the optical rotation when:

for
$$\alpha_1-\beta = (2k+1)\ \pi/4$$
$$0 < \theta < \pi/4$$
$$0 > \theta > -\pi/4 \quad (11)$$

or a variation of the said optical rotation about a predetermined level $(\theta_0)$ for:

$$\alpha_1-\beta = (2K+1)(\pi/4) - \theta$$

for
$$0 < \Delta\theta < \pi/4$$
$$0 > \Delta\theta > -\pi/4 \quad (12)$$

From Equation 7 the sensitivity of the system for detecting an optical rotation is proportional to the light path length $l$ through the active material or its solution as in the optical polarimeter. The degree of regulation in vibration amplitude $(dA)$ limits the sensitivity $(d\theta)$, this limit being:

$$dA_{01}/A_{01} \leq \tan(\theta+\alpha_1-\beta)d\theta \quad (13)$$

The partial differential in terms of the absorption coefficient is somewhat more difficult to deal with. Evidently, for perfect transparent optically active substances, or their solution in transparent solvent, the absorption coefficient vanishes and, thus, cannot affect the determination of the angle of rotation. Several cases must be considered.

Attempting to measure the angle of rotation for an optically active colored substance, not in solution, the sensitivity, since $(l)$ is the only available variable, takes the form:

$$dE_1 = A_{01}e^{klc}\cos^2(\theta+\alpha_1-\beta)[(k'\ dl+2$$
$$\tan(\theta+\alpha_1-\beta)d\theta)] \quad (14)$$

but $d\theta = [\alpha]\rho dl$, thus, the term between the double parenthesis becomes $$((k'+2\tan(\theta+\alpha_1-\beta)[\alpha]\rho))dl \quad (15)$$

and reaches zero for:

$$k' = -2\tan(\theta+\alpha_1-\beta)\rho[\alpha] \quad (16)$$

The instrument, upon the introduction of the active substance, may or may not respond. In any case, its response cannot be taken as a measurement of the angular rotation in magnitude and sign. A negative rotation tends to cancel the absorption when the angle $(\theta+\alpha_1-\beta)$ is positive and vice versa. The variation of the length $(l)$ of the light path does not help. The only possible way to measure the optical rotation requires the determination of the absorption through the active material by means of a spectrophotometer or colorimeter utilizing a light beam of the same spectral characteristics as the polarizer.

In that case, the detailed procedure must be followed, namely, (a) Measurement of the transmission with a colorimeter
$$e^{-klc} = E_c/E_{0c} \quad (17)$$

(b) Standardization of the polarimetric set up
$$E_{\rho 1} = E_{\rho 01}\cos^2(\alpha_1-\beta) \quad (17a)$$

(c) Measurement of complex function of optical rotation plus transmission
$$E_{\rho 2} = E_{\rho 01}e^{-klc}\cos^2(\theta+\alpha_1-\beta) \quad (17b)$$

(d) Computation yields $$\cos^2(\theta+\alpha_1-\beta) = \frac{E_{\rho 2}}{E_{\rho 1}} \times \frac{E_{0c}}{E_c} \times \cos^2(\alpha_1-\beta) \quad (17c)$$

where: $E_{0c}$ is the energy entering the absorbing medium and $E_c$ is the energy emerging from the absorbing medium, both measured with a colorimeter which does not involve the angle of optical rotation; and where $E_{\rho 1}$ is the energy which emerges from the analyser and $E_{\rho 01}$ is the energy emerging from the substance, both measured with a polarimeter; and assuming that the angle $(\alpha_1-\beta)$ is known. If this last angular value is unknown, a second series of measurements must be taken with the light path $(l'=2l)$ through the active substance.

However, the effect of the absorption coefficient decreases substantially if the polarimetric measurement is performed with a light wave length corresponding to that which is most readily transmitted by the active substance, or close to it.

When the active material, in solution with a colorless solvent, produces a color whose intensity thus depends upon the relative concentration of the solute, the partial differential equation representative of the sensitivity becomes:

$$dE = A^2{}_{01} e^{-klc} \cos^2 (\theta + \alpha_1 - \beta)((k + 2 \tan (\theta + \alpha_1 - \beta)\rho))ldc \quad (18)$$

The sensitivity varies as a function of the concentration in quite a complex manner because the term in double parenthesis is cancelled for a given angle with a change of sign. It is imperative to use monochromatic light of wave length corresponding to the maximum transmission of the colored solution in conjunction with the measurement of the said transmission as previously outlined. The same general remark applies to the case of a colored solvent although the selection of the monochromatic wave length must be governed by the maximum of the solute spectral transmission. Selecting the solvent maximum transmission may dictate a wave length corresponding or close to the absorption band head wave length or Drude's constant $\lambda m$ of the solute at which the Cotton's effect appears. In case of anomalous dispersion and in the vicinity of the absorption band head the indications of the instrument would be very difficult to interpret.

The Cotton's effect may challenge the experimentators skill, since on each side of the inflection point there exist two maxima of rotary power; one dextrogyre and the other sinistrogyre.

The direct measurement of the light energy emerging from a polarimetric arrangement may be used to determine the optical angular rotation, provided that the polarizer and analyser are orientated so as to make a 45° angle between their respective planes of polarization The method is also applicable to measure the angular variations around a predetermined angular value $\theta$. Then, the polarizer and analyser planes of polarization are so orientated that the sum of their angle plus the preset level $\theta_0$ of optical rotation is equal to 45° or an odd multiple of 45°. In this way, it becomes possible to measure or record small optical angular variations around a known reference point.

The Crumpler system is readily applicable to colorless, active substances or solutions of them. However, the system suffers a loss of accuracy and sensitivity to a greater or lesser degree, for colored active media, unless an appropriate monochromatic light beam is used, such light beam being selected to minimize the influence of absorption.

Colored solutions of active substances also make necessary the selection of an angle of definite sign between the polarizer and analyser planes of polarization. If the substance is dextrogyre, the plane of polarization of the polarizer must make an angle of 45° in a clockwise direction reckoned from the angular position of the analyser plane of polarization. For a sinistrogyre substance the polarizer plane of polarization lays at an angle of 45° in a counterclockwise direction reckoned from the analyser plane. These arrangements cause the emerging light energy to decrease when the concentration of the optically active substance increases.

If these angular arrangements are not observed, an increase of angular rotation resulting from an increase in concentration of the colored active substance will cause an increase of the emerging light energy which will be partially or even completely absorbed by the concomitant increase of absorption.

On the other hand, if a colorless, active chemical is in solution in a colored solvent the angular arrangements between analyser and polarizer planes of polarization are the opposite of those just mentioned. The transmission increasing with the solute concentration, the correlative increase of the rotation must tend to decrease the phase angle between the axes of the analyser and of the polarizer light entering it after passing through the medium.

By developing, in series, the term $\cos^2 (\theta + \alpha_1 - \beta)$ of Equation 7 in which the angle $(\alpha_1 - \beta) = (2k+1) \pi/4$ a convenient expression for the discussion of the linearity of the system is obtained:

$$E_1 = A^2{}_{01} e^{-klc}((\tfrac{1}{2} \pm \theta(1 - \tfrac{2}{3}\theta^2 + \tfrac{2}{15}\theta^4 - \ldots))) \quad (19)$$

It indicates that an angular optical rotation of ±6° introduces a deviation of less than 1% from linearity.

Thus, by making the angle $(\alpha_1 - \beta)$ equal to ±39° instead of 45°, a dextro or a levogyre rotation varying by as much as 12°, may be measured or recorded with an accuracy of ±½%.

THE INVENTION—RATIO METHOD

The ever present absorption by a transparent medium, be it neglectible or important, impedes the measurement and recording of an optical rotation by means of a simple polarimetric arrangement used in connection with a light sensitive transducer. Means and methods whereby the absorption factor may be eliminated must be devised.

Considering again Equation 6 rewritten here for the sake of clarity:

$$E_1 = A^2{}_{01} e^{-klc} \cos^2 (\theta + \alpha_1 - \beta) \quad (20)$$

It appears that the factor $e^{-klc}$ for the active material either in the pure state or in solution remains unchanged. However, the absorption factor can be eliminated by selection of a second angular rotation $(\alpha_2 - \beta)$ between the polarizer and analyser, thus establishing a second equation. The other parameters: amplitude of the vibration A, length of light path $l$, concentration $c$ and thus, the angle or optical rotation, will be found again with their same respective values but the measurable energy $E_2$ will be modified by the new angular distance $(\alpha_2 - \beta)$ between polarizer and analyser planes of polarization alone.

If this may be the case, for the same optically active material two different relationships, expressing the different measurement conditions, can be concurrently written:

$$E_1 = A^2{}_{01} e^{-klc} \cos^2 (\theta + \alpha_1 - \beta) \quad (21)$$
$$E_2 = A^2{}_{01} e^{-klc} \cos^2 (\theta + \alpha_2 - \beta) \quad (22)$$

Thus, a simple division of one of the two equations by the other establishes a ratio $r$:

$$r = \frac{E_1}{E_2} = \frac{\cos^2 (\theta = \alpha_1 - \beta)}{\cos^2 (\theta + \alpha_2 - \beta)} \quad (22a)$$

in which the quantities $E_1$ and $E_2$ are effectively measured by the light transducer, while the angular quantities $\alpha_1 - \beta$ and $\alpha_2 - \beta$ are known since being initially preset at a selected value.

Hence, the measurable ratio $r$ assigns a specific value to the angle $\theta$; or becomes the function of the variable $\theta$. The absorption coefficient and even the vibration amplitude vanish from the relationship.

However, the ratio $r$ obtained in this manner, cannot serve for analysis or for measurement practice; it cannot be compared against another one and a common term of comparison is missing.

In effect, measurements achieve usefulness when related to a definite base or to an origin. Here, in this last expression, the measured ratio, dimensionless by its nature, takes, as it can be seen, any given value when the optical rotation becomes zero, depending upon the arbitrary selection of the angles $\alpha_1 - \beta$ and $\alpha_2 - \beta$. The method needs standardization.

Before proceeding any further, it is convenient to perform a change of reference axis for the angular distances. Taking the plane of polarization of the analyser as origin, the angle $\beta$ becomes zero and the writing is greatly simplified.

The standardization requires that the origin or the term of comparison be ascertained in a precise manner. For this purpose, it suffices to adjust the light sensitive transducer output, corresponding to a null optical rotation, at a selected known value for both of the two polarizer-analyser angular arrangements. Therefore, the preliminary standardization introduces the initial relationship:

$$E_0 = A_0^2 \cos^2 \alpha_1 = k^2 A_0^2 \cos^2 \alpha_2 \text{ for } \theta = 0 \quad (24)$$

This equation defines the origin of the measurements in the form of an initial ratio:

$$r = 1 \quad (25)$$

irrelevant of the values $\alpha_1$ and $\alpha_2$, from which all other obtainable ratios reflecting the effect of the optical rotation will be reckoned.

Naturally, the accuracy of the method reflects the precision selected to establish the origin. If $E_0$ and $E_0'$ are the measured outputs of the light transducer during standardization and $dE_0$ and $dE_0'$ the absolute presiding sensitivities, the relationship:

$$dr_0 = \frac{dE_0 - dE_0'}{E_0} \quad (26)$$

for $E_0 \cong E_0'$ expresses the effective precision of the origin definition.

Therefore, as a consequence of the preliminary standardization, expressed by the Equation 24, the measurable ratio related to the angular optical rotation may be written:

$$r = \frac{\cos^2 \alpha_2 \cos^2 (\theta + \alpha_1)}{\cos^2 \alpha_1 \cos^2 (\theta + \alpha_2)} = \frac{E_1}{E_2} \quad (27)$$

Independently of the values $\alpha_1$ and $\alpha_2$ the ratio reaches unity when $\theta$ decreases to zero; a fixed and known origin has been established.

The computation of the differential of this last expression in terms of the angular variable $\theta$ defines the merits and sensitivity of the method, $$dr = \frac{E_2 dE_1 - E_1 dE_2}{E_2^2} = -2 \frac{\cos^2 \alpha_2}{\cos^2 \alpha_1} \times \frac{\sin (\alpha_1 - \alpha_2) \cos (\theta + \alpha_1)}{\cos^3 (\theta + \alpha_2)} \times d\theta \quad (28)$$

The sensitivity and the function are by no means close to being linear. However, the method cannot be disregarded as such.

Considering the sensitivity at the origin, obtained when the angle $\theta$ reaches zero, the preceding equation simplifies into;

$$dr = 2 (\tan \alpha_2 - \tan \alpha_1) d\theta \quad (29)$$

A striking characteristic immediately comes to light. The sensitivity, measured by the magnitude of the ratio variation $dr$ for a given angular increment $d\theta$, may take any value between 0 and infinity on account of the tangents of the angles $\alpha_1$ and $\alpha_2$ being factors of the angular variation. Further, the sensitivity and the function are selective to the direction or sign of the optical rotation.

From inspection of the Equation 29, it appears that the selection of $\alpha_2 = \alpha_1$ is useless because it makes the difference of the tangent equal to zero. However, selecting opposite signs for the angle $\alpha_1$ and $\alpha_2$ transforms the difference into the sum of the tangents thus increasing the sensitivity. Unfortunately, the selection of the absolute value for the tangents cannot be solely governed by the maximum sensitivity alone inasmuch as the available light energy output, proportional to $\cos^2 \alpha$, tends toward zero when $\alpha$ reaches the value $\pi/2$. This factor imposes definite limits on the selection of the angle $\alpha$ and on the range of optical angular rotation. The difference $\pi/2 - \alpha$ measures the useful range of measurement.

Operative conditions for both method and instrumentation are met when the angles between the planes of polarization of the analyser with the polarizers are made equal in absolute value and opposite sign.

This last stated optimum condition introduces some simplification in the expressions for the ratio $r$ and the sensitivity which take the forms.

$$r = \frac{\cos^2 (\theta - \alpha)}{\cos^2 (\theta + \alpha)} \quad (30)$$

$$dr = 2 \frac{\sin^2 \alpha \cos (\theta - \alpha) d\theta}{\cos^3 (\theta + \alpha)} \quad (31)$$

for $$\alpha_2 = -\alpha_1 = \alpha$$

$$dr = 4 \tan \alpha d\theta \quad (32)$$

for $\theta = 0$, to determine the sensitvity at the origin.

Careful examination of the significance and implications of the sensitivity at the origin leads to an important conclusion. In fact, this sensitivity at the origin, depending upon the smallest measurable variation $dE$ of the light energy E, may be written:

$$dr = 2 \frac{dE}{E_0} = 4 \tan \alpha d\theta \quad (33)$$

or $$d\theta = \frac{1}{2 \tan \alpha} \times \frac{dE}{E_0} \quad (34)$$

Therefore, for the same measurable ratio $dE/E$, the discernable variation $dc$ of the concentration reaches:

$$dc = \frac{1}{[\theta]_\rho l 2 \tan \alpha} \times \frac{dE}{E} \quad (37)$$

It is important to note that the length of the light path through the active solution is effectively magnified by a factor $\tan \alpha$. Or, for the same measurable relative variation of the light energy and the same light path length, the system has a sensitivity, 2 tan $\alpha$ times greater.

In view of this very important advantage, the lack of linearity loses some of its draw back. More complete analysis will permit to judge of the possibilities and limitations of the method.

To that effect, the expression (30) of the ratio $r$ is rewritten in terms of the tangents of the angles $\theta$ and $\alpha$; this operation yields:

$$r = \frac{(1 + \tan \alpha \tan \theta)^2}{(1 - \tan \alpha \tan \theta)} \quad (38)$$

This expression does not give much information as to the departure from linearity. However, one may develop it into a series in terms of tan $\alpha$ tan $\theta$. This gives relationship:

$$r = 1 + 4 \tan \alpha \tan \theta (1 + 2 \tan \alpha \tan \theta + 3 (\tan \alpha \tan \theta)^2 + 4 (\tan \alpha \tan \theta)^3 \ldots \quad (39)$$

In the same manner, the expression for the sensitivity becomes:

$$dr = 4 \tan \alpha (1 + \tan^2 \theta)(1 + 4 \tan \alpha \tan \theta + (3 \tan \alpha \tan \theta)^2 + (4 \tan \alpha \tan \theta)^3 \ldots )) d\theta \quad (40)$$

Computations for both values of $r$ and $dr$ can be conducted by means of the series expansion of the tangent in function of its angle.

$$\tan \theta = \theta + \frac{\theta^3}{3} + \frac{2\theta^5}{15} \quad (41)$$

Thus, the expression for the ratio $r$, in terms of the optical rotation angle is:

$$r = 1 + 4 \tan \alpha \theta + 8 \tan^2 \alpha . \theta^2 + \frac{4 \tan \alpha}{3}(1 + 9 \tan^2 \alpha)\theta^3 \cdots$$

$$+ \frac{16}{3} \tan^2 \alpha (1 + 3 \tan^2 \alpha)\theta^4$$

$$+ \tan \alpha \left(\frac{18}{5} + 12 \tan^2 \alpha + 20 \tan^4 \alpha \right)\theta^5 \cdots$$

$$(42)$$

which for very small angle of $\theta$ (less than about 0.05 radian) becomes $$\theta = \frac{E_1 - E_2}{4E_2 \tan \alpha} \quad (42a)$$

where, $E_1$ and $E_2$ are the relative energies of the light beams emerging from the analyser for the angles $\alpha$ and $-\alpha$, respectively, formed between the planes of polarization of the polarizer and analyser.

Evidently, the tangent of $\alpha$ or the angle $\theta$ need not be very large to render the departure from linearity, measured by the sum $8 \tan^2 \alpha\theta$, etc., in Equation 42, equal to or greater than the linear quantity $4 \tan \alpha\theta$. In fact, for the set of values:

$$\tan \alpha = 5 \text{ and } \theta = 0.1 \quad (43)$$

one obtains:

$$4 \tan \alpha.\theta = 2;\ 8 \tan^2 \alpha.\theta^2 = 2$$

$$\tfrac{4}{3} \tan \alpha (1 + 9 \tan^2 \alpha)\theta^3 = 1.506\ 666 \quad (44)$$

$$\tfrac{16}{3} \tan^2 \alpha (1 + 3 \tan^2 \alpha)\theta^4 = 1.013\ 333$$

$$\tan \alpha(\tfrac{8}{15} + 12 \tan^2 \alpha + 20 \tan^4 \alpha)\theta^5 = 1.265\ 026$$

$$4 \tan \alpha.\theta = 2 \text{ against } \sum_{2}^{5} (\tan \alpha.\theta) = 5.785\ 025$$

yielding the ratio $r = 2.892\ 512$

THE INVENTION—RATIO MINUS ITS RECIPROCAL

Seeking to improve the linearity without losing the achieved increase in sensitivity leads to the investigation of methods which may, at least, lead to the cancellation of the terms of even orders.

An examination of Equation 42 indicates that when the optical rotation $\theta$ changes from positive to negative while conserving its absolute value, the odd order terms alone become negative. Thus, if the value of the ratio $r_2$ corresponding to the negative sign is subtracted from the value $r_1$ obtained for the positive one, as per:

$$r_1 = 1 + 4 \tan \alpha.\theta + 8 \tan^2 \alpha.\theta^2$$
$$\quad + \tfrac{4}{3} \tan \alpha(1 + 9 \tan^2 \alpha)\theta^3 \ldots \quad (45)$$
$$-r_2 = -1 + 4 \tan \alpha.\theta - 8 \tan^2 \alpha.\theta^2$$
$$\quad + \tfrac{4}{3} \tan \alpha(1 + 9 \tan^2 \alpha)\theta^3 \ldots$$

a new relationship is established:

$$r_1 - r_2 = 8 \tan \alpha.\theta + \tfrac{8}{3} \tan \alpha(1 + 9 \tan^2 \alpha)\theta^3 \quad (46)$$

from which the even order terms vanish.

Although it is out of reach to govern the sign of the rotary power of chemical substance to permit this last operation, it remains that, before rejecting it as unpractical, the modification of the ratio $r$ by the introduction of negative values for $\theta$ must be analysed.

For this purpose, writing the original equation of the ratio $r$, column 16, Equation 22a, and changing the sign of $\theta$ to minus, as per:

$$r' = \frac{\cos^2(-\theta + \alpha)}{\cos^2(-\theta - \alpha)} \quad (47)$$

this expression appears equivalent to $$r' = \frac{\cos^2(\theta - \alpha)}{\cos^2(\theta + \alpha)} = \frac{1}{r} \quad (48)$$

which is the reciprocal of the original ratio $r$.

Thus, the difference $r_1 - r_2$, Equation 46, being equal to the difference between the measurable ratio $r$ and its reciprocal takes full operational significance.

The optical rotation $\theta$ becomes related to a directly measurable quantity $R$ by a function in which linearity is more closely respected. This new relationship may be fully written:

$$R = \frac{E_1}{E_2} - \frac{E_2}{E_1} = 8 \tan \alpha.\theta + \tfrac{8}{3} \tan \alpha(1 + 9 \tan^2 \alpha)\theta^3 \ldots \quad (49)$$

which, for very small angles of $\theta$ (less than about 0.05 radian) becomes, $$\theta = \frac{E_1^2 - E_2^2}{E_1 E_2 8 \tan \alpha} \quad (49a)$$

where $E_1$ and $E_2$ are the relative light energies of the light beams emerging from the analyser for the angles $\alpha$ and $-\alpha$, respectively, formed between the planes of polarization of the polarizer and analyser.

The differential of Equation 49 in respect to the variable $\theta$ yields the sensitivity of the method:

$$dR = \left(\frac{1}{E_1^2} + \frac{1}{E_2^2}\right)(E_2 dE_1 - E_1 dE_2)$$
$$= 8 \tan \alpha.d\theta((1 + (1 + 9 \tan^2 \alpha)\theta^2 + \ldots))$$
$$\quad (50)$$

Since the measurable variations $dE$ are opposite in sign while the energies $E_1$ and $E_2$ become equal to each other when the angle $\theta$ reaches 0, $$\frac{dE}{E} = 2 \tan \alpha.d\theta \quad (51)$$

equal to the one already established in Equation 34.

The departure from linearity decreases greatly in comparison with the previous method. Taking up again the same set of values as in Equation 43 for tangent and angle, one obtains:

$$8 \tan \alpha.\theta = 4.00$$

while $$\tfrac{8}{3} \tan \alpha(1 + 9 \tan^2 \alpha)\theta^3 = 3.013\ 333 \quad (52)$$

and $$2 \tan \alpha(\tfrac{8}{15} + 12 \tan^2 \alpha + 20 \tan^4 \alpha)\theta^5 = 2.530\ 052$$

thus, the ratio $$\rho_2 = \frac{5.543\ 385}{4} = 1.385\ 846$$

against the previous $\rho_1 = 2.892\ 512$.

This last method, correlating the angle of optical rotation to a measurable difference between a ratio and its reciprocal, has advantages over the previous one, but is still wanting as far as the linearity is concerned.

THE INVENTION—DIFFERENCE TO THE SUM RATIO METHOD

Different methods have been described above, by which the optical rotation $\theta$ produced by an optically active material can be measured. Their application, though simple in practical use, entails two defects which may seriously outweigh their sensitivity. The lack of linearity between the variable to be determined and the measurable quantity obtained in the form of a ratio whose zero cannot coincide with the zero of the variable compel one to seek a more appropriate method.

The measurable light energy emerging from a polarimetric set up is proportional to the cosine square of the phase angle made by the polarization axes of the analyser and of the light beam entering it. Thus, the energies corresponding to two different phase angles may be written:

$$E_1 = \cos^2 \alpha_1 \quad \text{and} \quad E_2 = \cos^2 \alpha_2 \quad (53)$$

assuming equal amplitudes of the vibrations. These two quantities may be added together or subtracted from each other to derive a relationship between the phase angles and the measurable energy amplitudes, as per:

$$E_1 + E_2 = \cos^2 \alpha_1 + \cos^2 \alpha_2$$
$$= \tfrac{1}{2}[1 + \cos 2\alpha_1 + 1 + \cos 2\alpha_2]$$
$$= \tfrac{1}{2}[2 + \cos(\alpha_1 + \alpha_2) \cos(\alpha_1 - \alpha_2)]$$
$$= 1 + \cos(\alpha_1 + \alpha_2) \cos(\alpha_1 - \alpha_2) \quad (54)$$

$$E_1 - E_2 = \cos^2 \alpha_1 - \cos^2 \alpha_2$$
$$= \tfrac{1}{2}[1 + \cos 2\alpha_1 - 1 - \cos 2\alpha_2]$$
$$= \tfrac{1}{2}[2 \sin(\alpha_1 + \alpha_2) \sin(\alpha_1 - \alpha_2)]$$
$$= \sin(\alpha_1 + \alpha_2) \sin(\alpha_1 - \alpha_2) \quad (55)$$

These two simultaneous equations present a characteristic property. When the difference between the phase angles is equal to $\pm 90°$, the Equation 54 reduces to a constant while the other Equation 55 expresses the value of the sine of the sum of the two angles.

$$E_1 + E_2 = 1 \qquad (56)$$

$$E_1 - E_2 = -\sin(\alpha_1 + \alpha_2)(\pm 1) \qquad (57)$$

The difference between the emerging light energies will continue to express the sign function of the sum of the two phase angles during their possible variations as long as their difference remains equal to $\pm 90°$. Such condition is fulfilled when each phase angle varies simultaneously by the same angular quantity. In other words, when the phase angles are respectively equal to:

$$\alpha_1 = \alpha_{01} + \theta \text{ and } \alpha_2 = \alpha_{02} + \theta \qquad (58)$$

while the following equality is satisfied:

$$\alpha_1 - \alpha_2 = \alpha_{01} - \alpha_{02} = \pm \pi/2 \qquad (59)$$

Combining these two equalities the sum of the phase angles may be written:

$$\alpha_1 + \alpha_2 = 2 d_{01} \pm \frac{\pi}{2} + 2\theta = 2\left(\alpha_{01} \pm \frac{\pi}{4} + \theta\right) \qquad (60)$$

Moreover, the angular variation $\theta$ appears alone when:

$$\alpha_{01} \pm \frac{\pi}{4} = 0 \qquad (61)$$

Finally, by appropriate selection of angular constants combined with the restrictions that $\alpha_1 - \alpha_2$ is equal to $\pm \pi/2$ and $\alpha_{01}$ is equal to $\pm \pi/4$, the difference between the two energies represents the sine function of the sum of the phase angles variations as expressed by:

$$E_1 - E_2 = \pm \sin 2\theta = \pm 2\theta(1 - \tfrac{2}{3}\theta^2 + \tfrac{2}{15}\theta^4) \qquad (62)$$

This is of considerable interest because the linearity between the difference of the energies and the variation of the phase angles is respected within a deviation of the second order at most. Also, since the sum of the energies stays constant whatsoever may be the magnitude of the phase angles sum, the ratio of the difference to the sum of the said energies remains strictly proportional to the phase angle variation. Therefore, the equality:

$$\frac{E_1 - E_2}{E_1 + E_2} = m \sin 2\theta \qquad (63)$$

where $m$ represents a constant coefficient, establishes a nearly linear function between measurable quantities and the variable to be measured.

Of greater importance for polarimetric measurements is the fact that if a common factor such as the transmission coefficient effects the absolute values of the emerging energies, this factor vanishes in the established ratio.

Therefore, replacing the absolute measurable light energies as emerging from the polarimetric arrangement by their complete expression in terms of vibration amplitude, transmission coefficient and phase angles, the Equation 63 may be rewritten as per:

$$\frac{E_1 - E_2}{E_1 + E_2} = \frac{A_0^2 e^{-klc} \cos^2(\alpha_1) - A_0^2 e^{-klc} \cos^2(\alpha_2)}{A_0^2 e^{-klc} \cos^2(\alpha_1) + A_0^2 e^{-klc} \cos^2(\alpha_2)} \qquad (64)$$

This equation after development and simplification yields:

$$\frac{E_1 - E_1}{E_1 + E_2} = \frac{\sin(\alpha_1 + \alpha_2) \sin(\alpha_1 - \alpha_2)}{1 + \cos(\alpha_1 + \alpha_2) \cos(\alpha_1 - \alpha_2)} \qquad (65)$$

with the conditions, $$\alpha_1 - \alpha_2 = \pm \pi/2; \ \alpha_1 = \alpha_{01} + \theta; \ \alpha_2 = \alpha_{02} + \theta$$

$$\alpha_{01} + \alpha_{02} = \pm \pi/2$$

the expression reduces to the practical relationship:

$$r = \frac{E_1 - E_2}{E_1 + E_2} = \pm \sin 2\theta \qquad (66)$$

whose sign depends upon the sign of the sum $\alpha_{01} + \alpha_{02}$. This ratio, proportional to the sine of twice the optical angular variation, reaches zero when $\theta$ does.

The differential of (66) with respect to the variable $\theta$ takes the form:

$$dr = \frac{dE}{E} = \pm 2 \cos 2\theta . d\theta \qquad (67)$$

The ratio, therefore, discriminates the sign of the variation $d\theta$ and the sensitivity at the origin yields the minimum angle of optical rotation which can be detected:

$$d\theta = \frac{dE}{2E} \qquad (68)$$

As such, though the linearity is practically respected over a rather wide range of optical rotation, the method does not produce the high relative sensitivity magnification already found in the previous developments.

If the phase angles $\alpha_{01}$ and $\alpha_{02}$ instead of being restricted to being equal to $\pm \pi/4$ are given other angular values $\pm \alpha$, the Equation 66 takes the new form:

$$r = \frac{E_1 - E_2}{E_1 + E_2} = \frac{\sin 2\alpha \sin 2\theta}{1 + \cos 2\alpha \cos 2\theta} \qquad (69)$$

for $\alpha_{01} = -\alpha_{02} = -\alpha$.

The differential of the new expression becomes at the origin:

$$dr = \frac{dE}{E} = 2 \tan \alpha . d\theta \qquad (70)$$

and the smallest measurable optical rotation becomes:

$$d\theta = \frac{dE}{2 \tan \alpha E} \qquad (71)$$

This relationship indicates that the optical rotation variation is effectively multiplied by a factor $2 \tan \alpha$ which may be selected at will. The amount of light energy available for the light transducer to operate properly limits the magnitude of the possible amplification.

To compare the merits of the difference to the sum ratio method against the previously analysed ones, it becomes necessary to expand the Expression 69 in series.

This expression can be written:

$$r = 2 \tan \alpha . \tan \theta ((1 - (\tan \alpha . \tan \theta)^2 + (\tan \alpha \tan \theta)^4 - (\tan \alpha . \tan \theta)^6 \ldots \qquad (72)$$

and with $$\tan \theta = \theta + \tfrac{1}{3}\theta^3 + \tfrac{2}{15}\theta^5$$

the final expression is derived:

$$r = 2 \tan \alpha . \theta - 2\left(1 - \frac{1}{3 \tan^2 \alpha}\right)(\tan \alpha . \theta)^3 \ldots$$
$$+ 2\left(1 - \frac{1}{\tan^2 \alpha} + \frac{2}{15 \tan^4 \alpha}\right)(\tan \alpha . \theta)^5 - \ldots$$
$$- 2\left(1 - \frac{5}{3 \tan^2 \alpha} + \frac{33}{45 \tan^4 \alpha} - \frac{17}{315 \tan^6 \alpha}\right)(\tan \alpha . \theta)^7 \ldots \qquad (73)$$

which, for very small angles of $\theta$ (less than about 0.05 radian) becomes, $$\theta = \frac{E_1 - E_2}{E_1 + E_2} \times \frac{1}{2 \tan \alpha} \qquad (73a)$$

where $E_1$ and $E_2$ are the relative energies of the light beam emerging from the analyser for the angles $\alpha$ and $-\alpha$, respectively, formed between the planes of polarization of the polarizer and analyser. To compare the improved linear characteristic against the previous cases the set of values $\tan \alpha = 5$ and $\theta = 0.1$ is again used to compute the coefficient of departure. The computation yields:

$$r = 1 - 0.2467 + 0.0600 - 0.0145 \qquad (74)$$

from which $\rho = 1 - 0.201$ instead of the previous $\rho = 1.385$ and $\rho = 2.8925$.

It appears that the method of the difference to the sum ratio while providing all the advantage of the possible amplification of the optical rotation still keeps a fair linearity for a sufficient range of angular measurement.

On this basis, the angular phase angle $\alpha$ and the correlative transmission coefficients through the polarimeter set up are computed as a function of the different amplification factor $2 \tan \alpha$. The transmission coefficient is represented by the cosine square of the initial phase angle $$T = \cos^2 \alpha = \frac{1}{1+\tan^2 \alpha} \qquad (75)$$

The following tabulation presents the amplification factors ($2 \tan \alpha$), the phase angles ($\alpha$), the range of optical rotation ($\Delta \alpha$) and the transmission coefficients as obtained from Equation 75:

| $2 \tan \alpha$ | $\alpha$ | $\Delta \alpha$ | $T=1/(1+\tan \alpha)$, percent |
|---|---|---|---|
| 2 | 45°00′005″ | 45°00′00″ | 50 |
| 4 | 63°26′4″.2 | 26°33′55″.8 | 20 |
| 10 | 78°41′24″.24 | 11°18′35″.76 | 3.84 |
| 20 | 84°17′21″ | 5°42′49″ | 0.99 |
| 40 | 87°8′15″ | 2°51′45″ | 0.25 |
| 60 | 88°5′27″ | 1°54′33″ | 0.111 |
| 100 | 88°51′15″ | 1°8′45″ | 0.04 |

Figure 2:
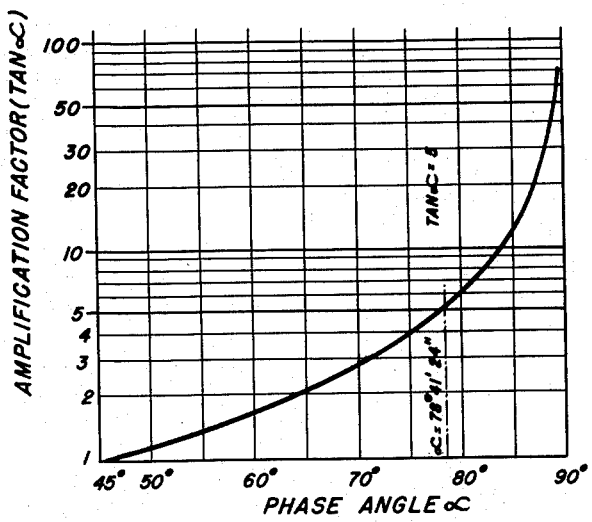
FIGURE 2 is a graph showing the variation in the amplification factor for various angles formed between the planes of polarization of a polarizer and analyser.
Figure 3:
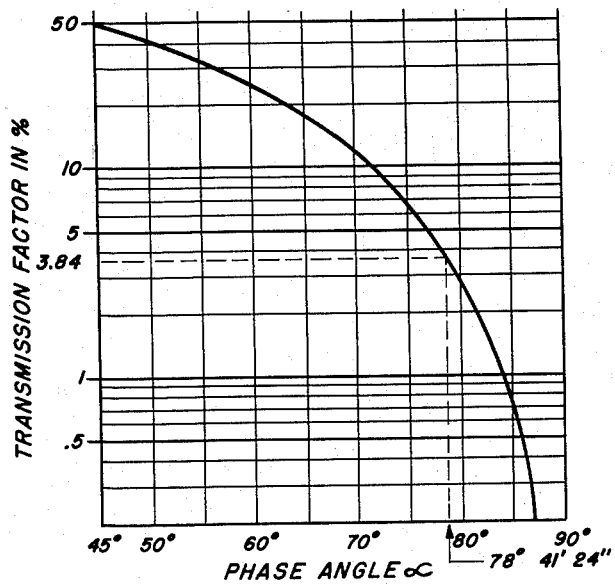
FIGURE 3 is a similar graph but showing the corresponding variations in the transmission factor.

Among the different possible amplification factors of optical rotation, see FIGURES 2 and 3, the value $2 \tan \alpha = 10$ appears as the most suitable for use in connection with existing types of colorimeters and spectrophotometers since the corresponding transmission $T_{10} = 3.84\%$ is still compatible with those instruments. It has the advantage to furnish, in combination with a 1 cm. light path, the equivalent optical rotation observed with the optical polarimeter standard 10 cms. cell while the practical sensitivity is two times as great.

In view of the practicability of the system, the values of the difference to the sum ratio $r$ have been computed with six exact figures for optical rotations varying in steps of 30 minutes each and for the range extending from 0 to 8° 30′ and this for the amplification $2 \tan \alpha = 10$ corresponding to the angle $\alpha = 78°41′24″.24$. The $r$ values, as well as the successive differences are consigned in the following chart.

*Difference to Sum Ratio Values for $2 \tan \alpha = 10$;*
*$\alpha = 78°41′24″.24$ and Step Differences*

| Rotation | Ratio | 1st Diff. | 2nd Diff. | 3rd Diff. | 4th Diff. |
|---|---|---|---|---|---|
| 0°00′ | 0.000 000 0 | | 0.000 000 0 | | 0.000 000 |
| | | 0.087 102 4 | | −0.000 973 6 | |
| 30′ | 0.087 102 4 | | −0.000 973 6 | | 0.000 033 1 |
| | | 0.086 128 8 | | −0.000 940 | |
| 1°00′ | 0.173 231 2 | | −0.001 914 1 | | 0.000 070 4 |
| | | 0.084 214 7 | | −0.000 870 1 | |
| 1°30′ | 0.257 445 9 | | −0.002 784 2 | | 0.000 095 4 |
| | | 0.081 430 5 | | −0.000 774 7 | |
| 2°00′ | 0.338 876 4 | | −0.003 558 9 | | 0.000 118 3 |
| | | 0.077 871 6 | | −0.000 656 4 | |
| 2°30′ | 0.416 748 0 | | −0.004 215 3 | | 0.000 128 8 |
| | | 0.073 656 3 | | −0.000 527 6 | |
| 3°00′ | 0.490 404 3 | | −0.004 742 9 | | 0.000 137 2 |
| | | 0.068 913 4 | | −0.000 390 4 | |
| 3°30′ | 0.559 317 7 | | −0.005 133 3 | | 0.000 134 5 |
| | | 0.063 780 1 | | −0.000 255 9 | |
| 4°00′ | 0.623 097 8 | | −0.005 389 2 | | 0.000 127 2 |
| | | 0.058 390 9 | | −0.000 128 7 | |
| 4°30′ | 0.681 488 7 | | −0.005 517 9 | | 0.000 112 5 |
| | | 0.052 873 0 | | −0.000 016 2 | |
| 5°00′ | 0.734 361 7 | | −0.005 534 1 | | 0.000 099 7 |
| | | 0.047 338 9 | | −0.000 083 5 | |
| 5°30′ | 0.781 700 6 | | −0.005 450 6 | | 0.000 084 1 |
| | | 0.041 888 3 | | 0.000 167 6 | |
| 6°00′ | 0.823 588 9 | | −0.005 283 0 | | 0.000 061 1 |
| | | 0.036 605 3 | | 0.000 228 7 | |
| 6°30′ | 0.860 194 2 | | −0.005 054 3 | | 0.000 050 4 |
| | | 0.031 551 0 | | 0.000 279 1 | |
| 7°00′ | 0.891 745 2 | | −0.004 775 2 | | 0.000 030 4 |
| | | 0.026 775 8 | | 0.000 309 5 | |
| 7°30′ | 0.918 521 0 | | −0.004 465 7 | | 0.000 023 7 |
| | | 0.022 310 1 | | 0.000 333 2 | |
| 8°00′ | 0.940 831 1 | | −0.004 132 5 | | 0.000 012 0 |
| | | 0.018 177 6 | | 0.000 344 2 | |
| 8°30′ | 0.959 008 7 | | −0.003 788 3 | | 0.000 004 0 |

Figure 4:
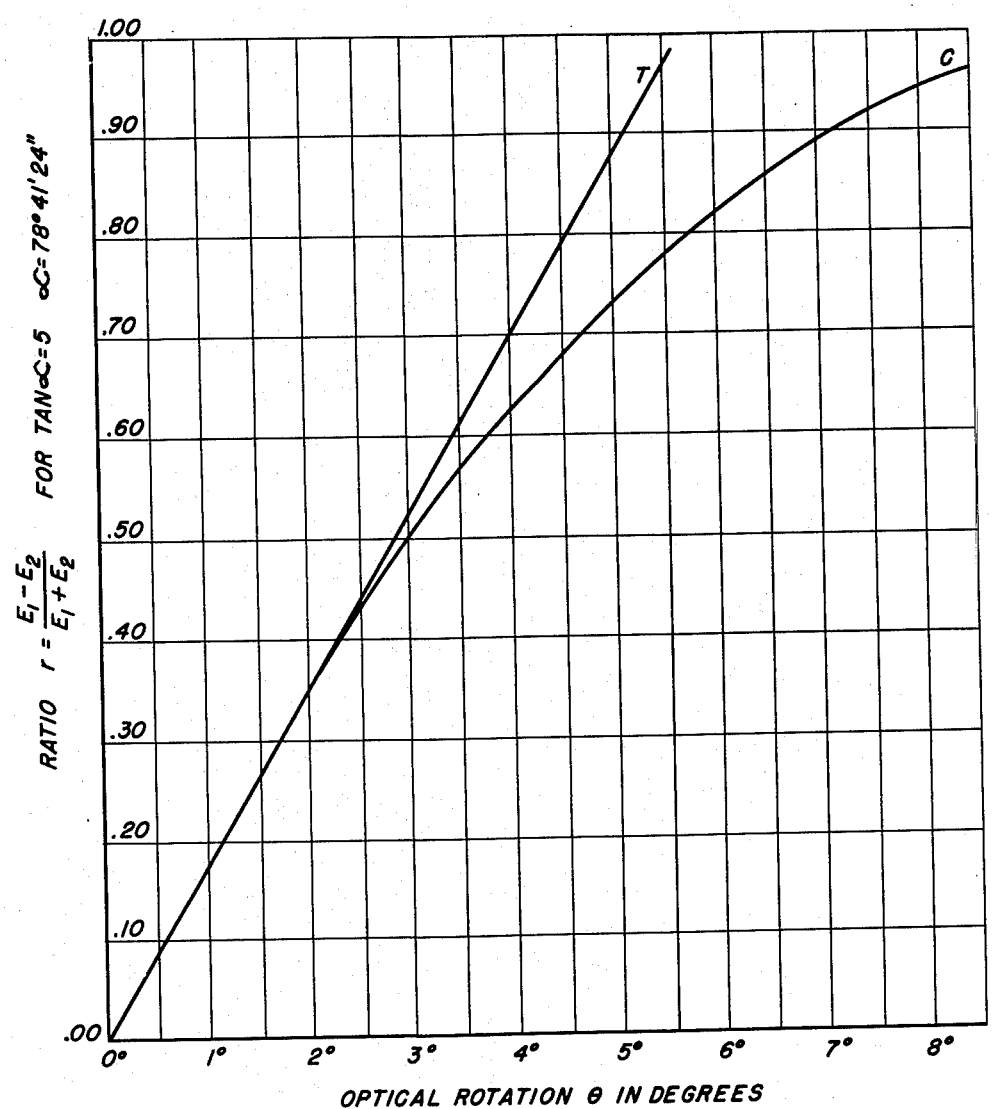
FIGURE 4 is a graph showing the magnitude of the angular rotation obtained by the practice of one form of my novel method, namely, in accordance with the ratio of the difference to the sum of the light transducer readings.

The values of the ratio, in the above table, are plotted in FIGURE 4, curve C, as a function of the optical rotation in degrees. The straight line, curve T, which is tangent at the origin to curve C, serves to indicate the departure of curve C from linearity.

The possibilities of the method with respect to the optical polarimeter emerge from the comparison between their effective power of angular resolution, as shown below.

*Polarimeters—Angular Resolving Powers*

| Optical Polarimeter | Photoelectric Polarimeter | |
|---|---|---|
| $d\theta = \pm 40″$ | $2 \tan \alpha = 2$ | $d\theta = \pm 1′40″$ |
| | $2 \tan \alpha = 5$ | $d\theta = \pm 40″$ |
| | $2 \tan \alpha = 10$ | $d\theta = \pm 20″$ |
| | $2 \tan \alpha = 20$ | $d\theta = \pm 10″$ |

THE INVENTION—METHOD OF OBTAINING IMPROVED LINEARITY OF RESPONSE

Until now the method of the difference to the sum ratio has been analysed in a purely theoretical case of exact angular phasing between polarizer and analyser. In so doing, the general characteristics have been clearly defined, but it remains to consider the practical realization and operation as well as any possible refinement in view of the obtention of a more linear response.

At first, proper consideration must be given to the practical accuracy with which the initial phase angles must be maintained and the effect of an error or tolerance upon the response characteristics.

The analysis of the method has been based upon the assumption that $$\alpha_1 = -\alpha + \theta \text{ and } \alpha_2 = \alpha + \theta$$

leading to the implicit standardization condition for $\theta = 0$:

$$E_{01} = A^2_0 e^{-klc} \cos^2(-\alpha) = A^2_0 e^{-klc} \cos^2(+\alpha) = E_{02} \quad (76)$$

This assumed equality permitted the Equation 64 to be written and discussed. However, the initial phase angles may carry a departure from equality in absolute value and in this condition, the phase angles for any value of $\theta$ must be given a general form such as:

$$\alpha_1 = -\alpha + e_1 + \theta \text{ and } \alpha_2 = \alpha + e_2 + \theta \quad (77)$$

The introduction of the deviations $e_1$ and $e_2$ imposes an initial standardization with an optically inactive solvent, that is, an adjustment of the light energy striking the analyser. The adjusting of the emerging energies $E_{01}$ and $E_{02}$ to be equal in absolute value in the absence of the optically active material leads to the following relationship:

$$E_{01} = A^2_{01} e^{-klc} \cos^2 \alpha' = A^2_{02} e^{-klc} \cos^2 \alpha'' = E_{02} \quad (78)$$

in which the angular values $\alpha'$ and $\alpha''$ represent $$\alpha' = -\alpha + e_1 \text{ and } \alpha'' = +\alpha + e_2 \quad (79)$$

for the simplification of the writing. Thus, the standardization amplitudes $A_{01}$ and $A_{02}$ become related to each other by:

$$A_{02} = A_{01} \times \frac{\cos^2 \alpha'}{\cos^2 \alpha''} \quad (80)$$

Incorporating these values for the different amplitudes of the vibration into the equation expressing the ratio of the difference to the sum of the emerging energies, the general expression is obtained:

$$r = \frac{E_1 - E_2}{E_1 + E_2} = \frac{\cos^2 \alpha'' \cos^2 \alpha_1 - \cos^2 \alpha' \cos^2 \alpha_2}{\cos^2 \alpha'' \cos^2 \alpha_1 + \cos^2 \alpha' \cos^2 \alpha_2} \quad (81)$$

The angular quantities $\alpha'$, $\alpha''$ stay constant for a given instrument. At the limit, when the angular rotation becomes null, the ratio (81) also reaches zero. For any value of the optical rotation $\theta$ the new function will depart more or less from the original Equation 64 depending upon the magnitude of the angular deviations $e_1$ and $e_2$.

Unfortunately, the direct development and analysis of the Equation 81 leads to great complication, but by using a McLaurin's development of the general form:

$$F(x) = F(0) + \frac{x}{1} F'(0) + \frac{x^2 F''}{2!}(0) + \frac{x^3 F'''}{3!}(0) \quad (82)$$

it becomes possible to investigate the behavior of the function $r$ when angular deviations are present. For this purpose the successive derivatives of the function $r$ are computed for the condition $\theta = 0$ while the initial phase angles $\alpha'$, $\alpha''$ between analyser and polarizer take the values indicated in (79).

Thus, the following relationships:

$$\frac{dr}{d\theta} = \tan \alpha'' - \tan \alpha' = \tan(\alpha + e_2) + \tan(\alpha - e_1) \quad (83)$$

$$\frac{d^2 r}{d\theta^2} = \tan^2 \alpha'' - \tan^2 \alpha' = ((\tan(\alpha + e_2) - \tan(\alpha - e_1)))$$
$$((\tan(\alpha + e_2) + \tan(\alpha - e_1))) \quad (84)$$

$$\frac{d^3 r}{d\theta^3} = 2((\tan \alpha'' - \tan \alpha'))((3 \tan \alpha'' \tan \alpha' + 1))$$
$$= -2((\tan(\alpha + e_2) + \tan(\alpha - e_1)))$$
$$((3 \tan(\alpha + e_2) \tan(\alpha - e_1) - 1)) \quad (85)$$

etc. etc.

Obtained under these forms, the successive derivatives offer little help; they must be expanded in series in terms of: $\tan \alpha$, $\tan e_2$, $\tan e_1$. Before proceeding and for the sake of simplification in the writing, it is convenient to express the following identities:

$$\tan \alpha = a, \tan e_1 = e_1, \tan e_2 = e_2 \quad (86)$$

which will be maintained throughout the computation:

Hence, the exact relationship between the difference to the sum ratio $r$ and the angle $\theta$ of the optical rotation takes the final form:

$$r = 2a\theta + \theta a^2 \left(1 + \frac{1}{a^2}\right)((e_2 - e_1 + a(e_2{}^2 + e_1{}^2) \ldots$$
$$+ a^2(e_2{}^3 - e_1{}^3) + a^3(e_2{}^4 + e_1{}^4) \ldots))$$
$$+ \theta^2 a^3 \left(1 + \frac{1}{a^2}\right)\left(\left(e_2 + e_1 + \frac{3a}{2}\left(1 + \frac{1}{3a^2}\right)(e_2{}^2 - e_1{}^2) \ldots\right.\right.$$
$$+ 2a^2 \left(1 + \frac{1}{2a^2}\right)(e_2{}^3 + e_1{}^3) \ldots))$$
$$+ 2a^3 \left(1 + \frac{3}{4a^2}\right)(e_2{}^4 - e_1{}^4) \ldots))$$
$$- \theta^3 2 a^3 \left(1 - \frac{1}{3a^2}\right) - \theta^3 3 a^4 \left(1 + \frac{1}{a^2}\right)\left(1 - \frac{1}{9a^2}\right)(e_2 - e_1)$$
$$+ \frac{4}{3a}\left(\left(\left(1 + \frac{1}{2a^2}\right)(e_2 - e_1)^2 + e_2 e_1 - \frac{1}{12a^2}\left(1 + \frac{1}{a^2}\right)(e_2{}^2 + e_1{}^2)\right)\right)$$
$$+ \frac{1}{3}a^2 \left(\left(5 \left(1 + \frac{1}{3a^2}\right)(e_2 - e_1)^3\right)\right) \ldots$$
$$+ \frac{1}{3}a^2 \left(\left(10 - \frac{1}{a^2}\left(1 + \frac{1}{a^2}\right)\right)\right)(e_2 - e_1) e_2 e_1 \ldots \quad (87)$$

When $e_2 = e_1 = 0$, the development yields the same expression as already found in Equation 73. But as soon as those two quantities are no longer zero they effect the value of the function $r$. The term of the second order appears with a greater or lesser importance depending mainly upon the sum of the two deviations, so do the other even order terms.

The quantities $e_2$ and $e_1$ remaining small in absolute value and the terms made of their square, cube, etc., may be disregarded as negligible Thus, the terms of importance with respect to their influence over the modification of the function $r$ are:

$$\theta a^2 \left(1 + \frac{1}{a^2}\right)(e_2 - e_1) \quad (88)$$

$$\theta^2 a^3 \left(1 + \frac{1}{a^2}\right)(e_2 + e_1) \quad (89)$$

$$-\theta^3 2 a^3 \left(1 - \frac{1}{3a^2}\right) \quad (90)$$

The first one (88) of those three terms changes the angular coefficient of the straight line function $2a\theta$ and cannot effect the linearity. On the contrary, the other two introduce the departure from the said linearity. While the third term is inherent to the function, on the contrary the second one (89) appears as a consequence of the deviations $e$. Both of these two last terms do not modify the angular coefficient of the tangent to the curve at the origin.

To keep the angular coefficient at the origin within close limits from the requested value $2a$ imposes that either the deviations $e_1$ and $e_2$ are both zero or that their difference be equal to zero. The relative tolerable dispersion at the origin can be written directly:

$$|e_2 - e_1| < \frac{2n}{a\left(1 + \frac{1}{a^2}\right)} \quad (91)$$

where $n$ represents the tolerance in percent of the imposed angular coefficient $2a$.

With or without precalibration, the accuracy for the angular positioning of the polarizers should equal the effective sensitivity, that is, the smallest optical rotation which may be detected by the instrumentation. The magnitude of admissible tolerance effectively reaches:

$$e_2 - e_1 < \frac{dE}{E} \times \frac{1}{a^2 \left(1 + \frac{1}{a^2}\right)\theta} \quad (92)$$

This relationship stipulates that the precision for the angular positioning of the polarizers increases with the sensitivity. For $\theta = 6°$, $a = 5$ and $dE/E = 0.001$, the angular positioning accuracy is of the order of $e_2 - e_1 < 0.0004$ or 1 minute 20 seconds.

At this point, the complete development in series serves its purpose. In effect, and for all practical purposes, the strict condition imposed by the over all precision involves only the difference between the two angles $e_2$ and $e_1$, irrespective of their absolute value. At the same time, the departure from linearity varies with the sum of the two initial deviations $e_1$ and $e_2$. Thus, the important conclusion: the departure from linearity may be decreased while maintaining the same angular coefficient at the origin. Writing the absolute departure from linearity ($\rho$) as per:

$$\rho = a^3 \left( \left( 1 + \frac{1}{a^2} \right)(e_2 + e_1) - 2 \left( 1 - \frac{1}{3a^2} \right) \theta \right) \theta^2 \quad (93)$$

it is evident that this value reaches zero either for $\theta = 0$ or for:

$$e_2 + e_1 = \left[ \frac{1 - \frac{1}{3a^2}}{\left( 1 + \frac{1}{a^2} \right)} \right] 2\theta \quad (94)$$

Therefore, the linearity of the system within the practical range of utilization may be improved by proper treatment of the aberring factor. The aberration $q$, that is, the relative departure from linearity, takes clear significance when treated as a percentage error which, in this case, may be expressed by:

$$q = \frac{\rho}{r} \cong \frac{dr}{r} = + a^2 \left[ \left( \left( 1 + \frac{1}{a^2} \right) \left( \frac{e_2 + e_1}{2} \right) - \left( 1 - \frac{1}{3a^2} \right) \theta \right) \right] \theta \quad (95)$$

This expression, with the condition that $e_2 - e_1 = 0$ to preserve the invariance of the angular coefficient of the tangent at the origin as being $2a$, furnishes the necessary material for the analysis.

Depending upon the magnitude of the original angular deviation $e$ defined by the equation:

$$e = \frac{e_2 + e_1}{2} = e_2 = e_1 \quad (96)$$

the aberration (95) may be constantly negative for $e = 0$ or, being positive near the origin when $e$ is different from zero, it may pass through a maximum before reaching zero and then change its sign.

The aberration having the characteristic of a single valued continuous function within the practical useful range, three or four points of its representative curve being adequately selected permit its accurate discussion.

The aberration curve passes in all cases through the 0 of the $r$ function. The positive maximum, conditioned to the fact that $e$ is different from zero and positive, is determined by taking the first derivative of the Equation 95:

$$\frac{dq}{d\theta} = a \left[ \left( \left( 1 + \frac{1}{a^2} \right) e - 2 \left( 1 - \frac{1}{3a^2} \right) \theta \right) \right] \quad (97)$$

When this relationship reaches zero it defines the optical rotation $\theta_m$ corresponding to the positive maximum:

$$\theta_m = \frac{1 + \frac{1}{a^2}}{1 - \frac{1}{3a^2}} \times \frac{e}{2} \quad (98)$$

the transfer of this optical rotation $\theta_m$ into the Equation 95 yields the amplitude of the maximum:

$$q_m = a \frac{\left( 1 + \frac{1}{a^2} \right)^2}{1 - \frac{1}{3a^2}} \times \frac{e^2}{4} \quad (99)$$

After the positive maximum, the aberration function decreases to zero for the angular value:

$$\theta^1{}_0 = \frac{1 + \frac{1}{a^2}}{1 - \frac{1}{3a^2}} \times e \quad (100)$$

The value taken by the aberration when the angle equals the limit of the selected range of optical rotation furnishes another point of reference.

However, this last point of reference may serve the purpose of specifying the magnitude of the angular deviation $e$ to obtain the minimum possible aberration throughout the useful range. To this effect the limiting value $\theta_u$ of the optical rotation replaces the variable $\theta$ in the Equation 95 while the corresponding aberration becomes equal in absolute value to the positive maximum but negative in sign.

$$\left( 1 + \frac{1}{a^2} \right)^2 e^2 + 4 \left( 1 + \frac{1}{a^2} \right) \left( 1 - \frac{1}{3a^2} \right) \theta_u e - 4 \left( 1 - \frac{1}{3a^2} \right)^2 \theta_u{}^2 = 0 \quad (101)$$

yielding the requested angular deviation $e$:

$$e = 2(\sqrt{2} - 1) \left[ \frac{1 - \frac{1}{3a^2}}{1 + \frac{1}{a^2}} \right] \times \theta_u \quad (102)$$

When $a^2$ is very large in comparison with 1 the expression for the angular deviation reduces to:

$$e = 0.828 \times \left( 1 - \frac{4}{3a^2} \right) \theta_u \quad (103)$$

The beneficial effect of adding an initial deviation $e$ into the relative angular position $\alpha$ of the polarizers is important. It cannot be more vividly represented than by the comparison of the aberration values obtained with and without initial angular deviation. The different values are consigned in the following chart where the aberrations are in percent of the ratio function $r$ for $a = 5$ and $\theta_u = 0.05$.

*Aberration Chart*

| $\theta =$ | | 0.010 00 | 0.020 00 | 0.020 71 | 0.030 00 | 0.040 00 | 0.050 00 |
|---|---|---|---|---|---|---|---|
| $e =$ | 0.039 193 | $dr/r$ 0.774 7 | 1.056 1 | 1.058 | 0.844 1 | 0.139 2 | −1.059% |
| $e =$ | 0.00 | $dr/r$ −0.246 6 | −0.986 5 | --------- | −2.219 8 | −3.946 | −6.166% |

The graph, FIGURE 5, shows the two curves representative of the aberration or error function for the case $e = 0$ and $e = 0.039193$. With the correction introduced by the deviation $e = 0.039193$, the aberration or error is confined within the limits of $\pm 1.058\%$ while without correction the same aberration reaches $-6.166\%$.

It must be noted that the tangent at the origin to the aberration curve takes the value:

$$\tan \phi = \frac{\Delta q}{\Delta e} = a^2 \left( 1 + \frac{1}{a^2} \right) e \quad (104)$$

Naturally, the initial deviation $e$ added to the angular position of the polarizers must have the same sign as the one of the optical rotary power of the active chemical.

Reference is made to FIGURE 6 which is a vectorial diagram representing the effects upon the energy measurements of the light beam by introducing the deviation angle $e$ on the phase angle between the polarizer and analyser arrangements. As stated above, the effect of introducing such initial deviation is to improve the linearity of response of the system within a range of angular rotation variations preselected by experimental conditions. Here, O—X represents the reference axis parallel to the plane of polarization of the analyser. The angles $-\alpha$ and $+\alpha$ are the phase angles between the planes of polarization of the polarizer $P_1$ and polarizer $P_2$, with reference to the O—X axis. The angle $+e$ is added to these initial phase angles and, thus, the planes of polarization of the polarizers are, respectively, $-\alpha+e$ for $P_1$ and $+\alpha+e$ for $P_2$. The condition of standardization imposes equality between the projections of the amplitude vectors $A_{01}$ and $A_{02}$ on the axis O—X. This cannot be accomplished since the angles which such amplitude vectors make with the common axis are different by the angle $e$, the latter being added to one vector and subtracted from the other. Consequently, the amplitude of the vector $A_{01}$ must be reduced to $A_1$ whose projection on the axis O—X is equal to the projection $A_{02}$ in its new angular position $\alpha+e$. Now, the introduction of the angular rotation angle $\theta$ causes both vectors to rotate by the same angular displacement whereupon the projection $A_1$ on the axis becomes $E_1$, which is larger in magnitude than the projection $E_0$. Similarly, the addition of the angle $\theta$ to the already existing angle $+\alpha+e$ causes the cosine of the angle made by the vector $A_2$ with the axis O—X to decrease, whereby the projection $E_2$, of the vector $A_2$ becomes smaller than $E_0$. The percentage-wise variation of the two projections $E_1$ and $E_2$ differs, which effectively permits the cancellation of the third term of the series expansion (see Equation 87) by the value of the second order term introduced in the same expansion by the initial deviation $e$.

From the description given to this point, it will be seen that I have provided novel methods for determining the angular rotation of the plane of polarization of a light beam by a substance interposed in the light beam. By way of summary, this is accomplished by interposing the substance in a light beam between a polarizer and an analyser whose planes of polarization form a predetermined angle that is greater than zero and less than 90 degrees. Such angle is then changed to one of equal value but of reverse sign. By measuring the relative energies of the light beam emerging from the analyzer, for the two different orientations of the polarizer relative to the analyser, I obtain, effectively, an amplification of the sensitivity of the system. The angular rotation angle is obtainable directly from the relationship of the two energy measurements. These energy measurements are utilized in three specific ways, namely, as a direct ratio, as a ratio minus the reciprocal of the ratio, and as a ratio between the difference and sum of the energy values. Once having obtained the energy ratio for a given phase angle between polarizer and analyzer and for a given substance under test, a positive deviation angle of predetermined magnitude may be added to the polarizer-analyzer phase angle, by rotation of the polarizer, for both orientations of the polarizer, in order to improve substantially the linearity of response of the system.

INSTRUMENTATION FOR THE PRACTICE OF THE INVENTION

Reference is now made to FIGURE 8 which is a diagrammatic representation of one form of instrument. Here the light beam is generated by a lamp 10 energized by a stabilizing, constant voltage transformer 11, which maintains the correct current for operation of the instrument. A fully corrected Mangin, back-surface mirror 12 focuses the light rays to pass through a high efficiency, corrosion resistant heat filter 13. It may here be pointed out that the lamp 10 is of the prefocused type provided with silver contacts so that the illustrated combination provides a concentrated, constant value light beam not subject to the usual fluctuations. A pivotally-mounted disc 14, made of aluminum or other material having good thermal conductivity, carries a plurality of color filters, the disc being so arranged and indexed that any selected filter may be inserted into the light beam, as, for example, the filter marked 15. After passing through a selected filter, the light beam impinges upon the surface of a light transducer such as a self-generating photocell 16 having its output terminals connected to an electrical indicating instrument 17, the latter including a pointer movable over a suitably calibrated scale. It will be apparent that the instrument pointer will deflect over the associated scale to an extent corresponding to the value of the light energy striking the photocell 16. As a practical consideration, the instrument 17 is constructed such that its indications are strictly linear with light energy.

The photocell 16 is supported in proper position by any suitable means as, for example, the support 18 which is capable of rotation about a vertical axis. The substance to be tested, in this case, a solution, is contained in a suitable test tube 19 which is insertable into the light beam between the filter 15 and the photocell. The provision for rotation of the photocell around the axis of the light beam is necessary in order to standardize the instrument. For example, if the instrument scale be calibrated from 0–100 percent transmission, the photocell is rotated to align the instrument pointer with the 100 scale mark with the test tube 19 removed. Then, upon inserting the test tube into the light beam, the instrument provides a direct reading of the percent transmission of light through the solution under test. For optical reasons, the test tube 19 preferably is a square, high quality, absorption cell. Rotation of the photocell to standardize the instrument is preferred to inserting resistance in the lamp circuit or in the photocell circuit, or inserting diaphragms into the light beam, since these methods, respectively, change the color temperature of the light beam, effect the linearity of response of the instrument, and change the light distribution.

As described to this point, the apparatus constitutes a conventional photoelectric colorimeter with the disc 14 carrying a plurality of color filters to cover the usual spectral field. Such colorimeter apparatus includes a fixed holder so constructed and positioned that the test tube may readily be inserted thereinto to be in proper operative position in the light beam between a selected filter and the photocell. In order to adapt such apparatus for the practice of my invention, I provide an adapter which adapter not only accommodates the test tube but also carries the polarizer and analyser. The construction of such adapter is shown in FIGURES 9–11.

In FIGURE 11, which is a central, vertical section, there is shown the holder 20 made of metal or plastic, which holder is secured in fixed position in the apparatus. A square hole 21 extends axially through the holder and such hole is intersected by transverse, circular hole 22 whose axis coincides with the axis of the light beam (see FIGURE 8) as it passes between the filter 15 and the photocell 16. The square hole 21 accommodates the adapter 23, shown in FIGURES 9 and 10, which adapter is made of a suitable material, such as plastic. Opposite faces of the adapter are provided with rectangular recesses, one such recess accommodating polarizer 24, as seen in FIGURE 9, and the other recess accommodating an analyser 25, as seen in FIGURE 11. The analyser and polarizer are strips of polarizing film, each being secured within the associated recess, as by screws 26. Further, these polarizing films are centered around a transverse, oblong hole 27 formed in the opposed walls of the adapter, which hole 27 is intersected by a longitudinal, generally-square hole 28. Such hole 28 does not extend entirely through the adapter but, rather communicates with a hole 29, of reduced size, thereby forming an interior shoulder, or base, for the support of the square test tube 19. As shown in FIGURE 10, the adapter walls defining the test-tube-accommodating hole 28 are partially of concave form. Such construction makes it possible to provide a snug fit for the test tube without resulting in undue friction between the walls of the test tube and the adapter. More importantly, the concave portions of the walls cannot be contacted by the test tube thereby eliminating any possibility of scratching the tube walls.

The adapter 23 includes an upper shoulder, or flange portion 30 which seats upon the upper surface of the holder 20. Such flange portion includes an upstanding boss 31 and carries appropriate markings, such as X+5 shown in FIGURE 10. The boss 31 serves as a reference index to assure proper orientation of the adapter when inserted into the holder 20. On the other hand, the markings designate the particular polarizer-analyser arrangement of the particular adapter; the illustrated markings signifying that the adapter carries a polarizer and analyser so oriented that a positive (+) angle is formed between their planes of polarization and that the tangent of such angle equals 5. When the adapter is inserted into the holder, it is retained in fixed position by means of a cap 32 threaded on to threads formed at the upper end of the holder, said cap being provided with a relatively large, central hole to expose, at all times, the markings carried by the adapter flange member 30.

Two such adapters 23 are provided as a set, one having a positive phase angle between the planes of polarization of the polarizer and analyser and the other having an equal phase angle but of reverse sign. The second adapter would carry the markings X−5. It will be apparent that when the assembly, shown in FIGURE 11, is substituted for the test tube 19, in the FIGURE 8 system, the light beam passes in the direction of the arrow F along the axis $O_1$—$O_4$ and perpendicular to the surfaces of both the polarizer 24 and the analyser 25. Such light beam entering the system at point $O_1$ passes unobstructed through the transverse opening 22 in the holder 20 and through the polarizer 24. Such light beam, now polarized, enters into and travels through the optically active substance (liquid or solution) contained within the transparent glass test tube 19 that is centered on the optical axis of the system. Upon its emergence from the liquid (which causes a rotation of the plane of polarization of the beam proportional to the rotary power of the substance, its concentration, and the length of the light path therethrough) the light beam progresses through the hole 27 in the adapter and through the analyser 25. The analyser allows only that component of the polarized vibration which is in phase with the analyser plane of polarization to pass without absorption. Finally, the light beam containing only the light energy corresponding to that vibration which is in phase with the analyser axis emerges from the holder 20 and impinges upon the sensitive surface of the photocell, the latter transforming such light energy into an electric current whose intensity is proportional to luminous energy. The instrument 17 provides a direct indication of such current.

For proper performance, the polarization axis of the polarizer 24, FIGURE 11, is oriented along the direction $O_1P_1$ making a selected angle $\alpha_1$, with an axis of reference perpendicular to the plane containing both the axis $O_1O_4$ of the light beam and the vertical axis $O_1Z$ of the test tube. The polarization axis of the analyser 25 is so oriented as to be perpendicular to the same plane containing the optical axis $O_1O_4$ of the system and the vertical axis $O_1Z$ of the test tube. Therefore, such axis of polarization of the analyser is parallel to the reference axis from which all angular positions are reckoned. The axis about which the photocell is rotatable, to permit adjustment of the magnitude of the electric current supplied to the indicating instrument, must be perpendicular to the direction of the analyser axis of polarization.

As stated hereinabove, a second adapter is necessary. This second adapter is identical in all respects to the one shown in FIGURES 9–11 except that the orientation of its polarization axis would be along the line $O_1P_2$ making the angle $\alpha_2$ with the same axis of angular reference perpendicular to the planes $O_1O_4$ and $O_1Z$. Preferably, the angles $\alpha_1$ and $\alpha_2$ are equal but of opposite sign. In accordance with conventional practice, a positive (+) sign corresponds to a clockwise rotation when looking toward the light source, while a minus (−) sign indicates a counterclockwise rotation.

To perform the measurement of the angular rotation produced by an active chemical in a pure state, or in solution, we proceed as follows. An adapter marked X+5 is inserted into position in the colorimeter (that is, into the beam of light between the filter 15 and the photocell 16, shown in FIGURE 8). Then a test tube containing either distilled water, or the particular solvent used in the test solution, is introduced into the adapter and the instrument standardized by rotating the photocell to obtain, say, a reading of 50% of full scale value. After standardization, such test tube is removed and replaced by a similar test tube but containing the substance to be analysed. Due to the angular rotation $\theta$ caused by the substance, the transmitted light energy reaching the photocell will differ from the standardization value. Assume this reading, on the indicating instrument, is now 72.5 which we shall call $E_1$.

Now, the adapter marked X+5 is removed from the instrument and replaced by one marked X−5. Introducing again the reference test tube containing distilled water, the instrument is again standardized to read 50% of full scale value. After removal of this test tube, the test tube containing the subtsance to be analysed is again inserted into the adapter and the new transmission read off the instrument scale, as for example, 30.3, which we shall call $E_2$. The values $E_1$ and $E_2$, which represent the relative energies of the light beam striking the photocell for the two polarizer-analyser arrangements are indicative of the angular rotation imparted to the light beam of the substance.

Even though the stated standardization of the system prior to measurement eliminates the effect of a variation in the intensity of the light beam, the possible absorption of light energy by a substance under test limits the simple amplitude measurement, except in specific cases as mentioned hereinabove in connection with Equation 6. It is preferable, therefore, to utilize a ratio approach $$\left(\frac{E_1}{E_2}\right)$$

or the difference between the ratio and its reciprocal $$\left(\frac{E_1}{E_2}-\frac{E_2}{E_1}\right)$$

or the difference to the sum ratio $$\frac{E_1-E_2}{E_1+E_2}$$

The last method, adapted as it is to the possibility of decreasing the aberration by preimposing an initial deviation angle on the orientation of the polarizer and analyser polarization axes, yields either close or exact linearity between the measurable quantities and the optical rotation.

Thus, in the example under discussion, the $$\text{ratio}=\frac{E_1-E_2}{E_1+E_2}=\frac{72.5-30.3}{72.5+30.3}=0.4105$$

which is strictly related to the angle of optical rotation $\theta$. For this case the angular rotation is $$\theta \simeq \frac{E_1-E_2}{E_1+E_2} \times \frac{1}{2\tan \alpha}=2°27'36''$$

see Equation 73, above. This indication, as already explained, is entirely independent of the light absorption through the chemical substance under test. It is to be noted that the sign of the rotation would be negative if $E_1$ has been found to be smaller than $E_2$. Consequently, the method is not only capable of accurate measurement of the optical rotation but discriminates its sign or direction.

The angular rotation of the light beam by the substance under test varies with the wave length of the light passing therethrough. Thus, in the practice of the invention, the filter-carrying disc is rotated to select that filter which will give a maximum instrument indication, or a filter which differentiates most effectively between specific chemical compounds contained in the particular substance under test.

Reference, for the moment, is again made to FIGURE 1, and it is assumed that the light transducer is a photovoltaic cell. Such cell usually is contained in a housing provided with a transparent glass, or plastic, window through which the light rays pass to strike the active surface of the cell. When the sensitive surface MNPQ of the photocell is not perpendicular to the direction of propagation of the light $O_0O_5$ and makes an angle $\beta$ therewith, or when this surface is rotated for the purpose of adjusting the electric current output, it is imperative that the direction of the axis of polarization $O_4X_4$ of the analyser be exactly perpendicular to such axis of rotation. The vector amplitude of the light vibration can unrestrictively penetrate, by refraction, the glass or plastic window of the photocell only when the plane of the said glass or plastic window is perpendicular to the incidence plane. On the contrary, if this vector amplitude, also called the electric vector of the vibration, is parallel to the plane of the sensitive surface, or to the glass plane, the light energy would be reflected outward to a greater or lesser degree depending upon the angle $\beta$.

Figure 12:
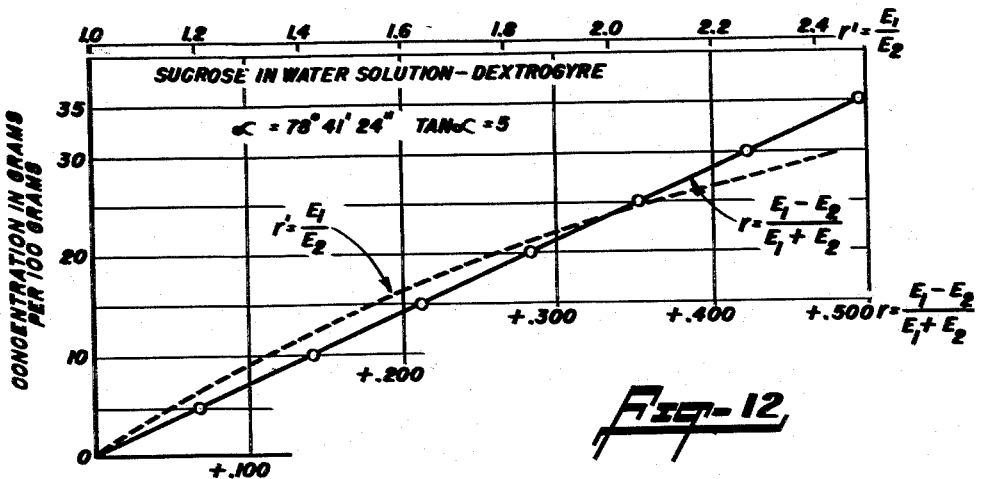
FIGURE 12 is a graph showing the results obtained with my method for sucrose in water solutions, when the tangent of the phase angle between the polarizer and analyzer polarization planes is equal to 5.0.

The graph of FIGURE 12 represents the experimental calibration of a colorimeter, provided with my polarizer-analyzer arrangement, for sucrose (positive or dextrogyre rotation) in water solutions, when the light path through the medium is limited to 1 cm. and the angles $\alpha$ are equal to $\pm 78°41'24''$ whose tangent is 5. The spectral composition of the light beam approximated closely the relative energy distribution of a light source at 5600° Kelvin limited at one end to 3900 angstroms and at the other end to 6700 angstroms. The broken line curve in FIGURE 12 represents the typical curve obtained when the simple ratios $$r' = \frac{E_1}{E_2}$$

of the measured light intensities are plotted against the concentrations for sucrose solutions. The departure from linearity is quite pronounced and would require individual calibration of the instrument. However, the curve of the ratios $$r = \frac{E_1 - E_2}{E_1 + E_2}$$

versus the concentrations is linear for all practical purposes as a consequence of adding an initial deviation angle $e=40$ minutes to the initial angular positions $\alpha$ and $-\alpha$ of the polarizers.

Figure 13:
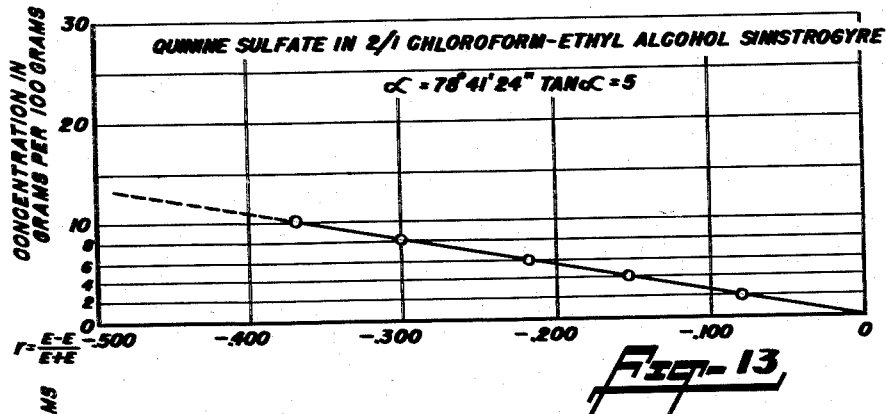
FIGURE 13 is a similar graph for relative concentrations of quinine solutions in the 2 chloroform, 1 ethyl alcohol solvent.

FIGURE 13 is a graph showing the results obtained by plotting the ratios $r$ against the relative concentrations of quinine solutions in the 2 chloroform, 1 ethyl alcohol solvent. This chemical is characterized by a negative or sinistrogyre rotation. As it can be seen, the curve so obtained is not strictly linear through close to it. This departure from linearity has been caused by a positive deviation of $e=40$ minutes added to the angular positions of the polarizers. By making the initial deviation of $e=-40$ minutes the curve straightens out.

The above two experimental results prove conclusively that within the useful range of the ratio $r$ values, the departure from linearity, though inherently small, can be corrected completely by the incorporation of an initial deviation angle $e$.

Figure 14:
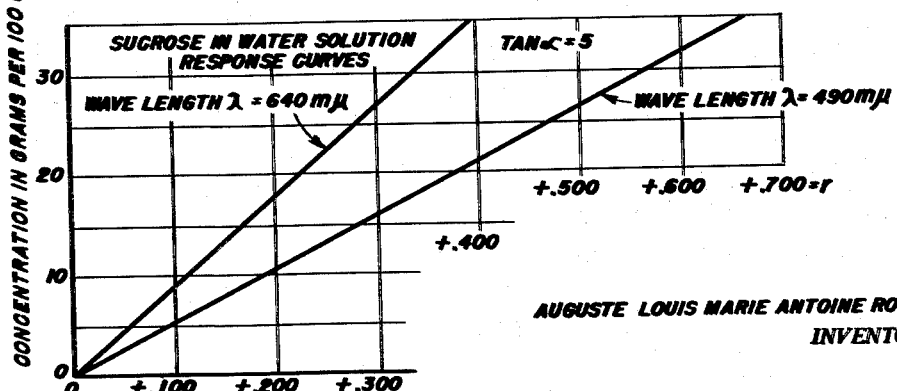
FIGURE 14 is a graph showing the influence of the light wave length upon the angular coefficient of the straight lines representative of the relationship of the difference to the sum ratios versus solution concentrations for light wave lengths of 640 and 490 millimicrons.

The graph of FIGURE 14 shows the influence of the light wave length upon the angular coefficient of the straight lines representative of the relationship of the difference to the sum ratio of $$\left(\frac{E_1 - E_2}{E_1 + E_2}\right)$$

versus the concentrations for the wave lengths 640 and 490 millimicrons and for the same sucrose solutions represented in FIGURE 12. Specifically, for a ratio of .300 the solution concentration is 26 grams per 100 grams of solution when the wave length of the light is 640 millimicrons, whereas with a light wave length of 490 millimicrons such solution concentration need be only 16 grams.

Now, if the path of the light beam through the solution under test is made 2 cms. instead of 1 cm., the ratio values, in all cases, are doubled. In such cases, the same values as obtained for the 1 cm. light path can be duplicated by selecting the angles $\alpha$ of the polarizers angular positions so that their tangent becomes 2.5 instead of 5.0.

The observed, practical, sensitivity for sucrose solutions reaches 20 seconds of arc, thus yielding an effective sensitivity of 7 parts per 10,000 by weight for the described experimental conditions. A light path of 20 cms. through the solution, in combination with a tangent $\alpha=10$ produces a sensitivity of 17.5 parts per million of sucrose in water.

Reference is now made to FIGURES 15 and 16, showing another construction of polarizer-analyser arrangement. Here, the fixed holder 35 corresponds to the holder 23 shown in FIGURE 11, but modified as will be described. The holder 35 is provided with a square, axial hole 36 to accommodate an adapter 37, preferably made of plastic, which adapter is provided with an axial hole similar to the hole 28 shown in FIGURE 10, for accommodating the test tube 19. Secured to one face of the holder 35 are a pair of spaced tracks 38, 38' having slanted, inner sides, as shown. These tracks are secured in fixed position on the holder as by the screws 39 and slidably support a slide plate 40. The outer surface of the slide plate is provided with two circular recesses accommodating the circular, polarizing films 41 and 42, said films being secured in position by three screws threaded into appropriate holes provided in the slide plate. The polarizer 41 has its plane of polarization $P_2$ oriented at an angle $\alpha$ with respect to the vertical reference axis $y$—$y'$ whereas the polarizer 42 has its polarization plane $P_1$ oriented at a similar angle $-\alpha$.

The opposite faces of the holder 35 carries a similar pair of spaced tracks 43, 43' supporting the slide plate 44 for slidable movement therebetween. Such slide plate 44 is similarly provided with a pair of circular recesses which, in this case, however, accommodate a pair of circular analysers, also formed of polarizing film, such analyser 45 being visible in FIGURE 16. The polarization planes of the analysers are normal to the axis $y$—$y'$, as indicated by the arrow marked $A_n$. Suitable means, not shown in the drawings, mechanically couples together the two slide plates 40 and 44 whereby such plates are movable simultaneously as a unit to the left or right.

When the slide plates are in the position shown in FIGURE 15, the combination of polarizer 41 and analyzer 45 are effective for measurement purposes. As has been described with specific reference to FIGURE 11, the light beam emerging from the filter (see also FIGURE 8) passes through the polarizer 41, the test solution contained in the test tube 19, and the analyser 45 prior to striking the light transducer. After taking a light energy reading $E_1$ under this condition, the slide plates are moved to the left thereby interposing the polarizer 42 and its associated analyser into the light beam, thereby conditioning the apparatus for the measurement of the light energy $E_2$.

It will be apparent that the illustrated construction is useful for applications wherein the two analysers have polarization planes disposed at different angles relative to the axis of reference $y$—$y'$. In most applications, however, such analysers will have their polarization planes set at a common angle. In the latter case, a single analyser is required, such analyser remaining in the light beam at all times irrespective of the movement of the slide plate 40 carrying the polarizers 41, 42. It is obvious that in the latter arrangement, the two slide plates 40 and 44 are not coupled together mechanically. The mounting of the slide plate 44, between the tracks 43, 43' facilitates the insertion and removal of analysers. Although not shown in the drawings, suitable stops, or indexing means are provided to assure the proper location of the polarizing films in the light beam.

The quick-changing arrangement shown in FIGURES 15 and 16 offers certain advantages over the replacement adapter arrangement shown in FIGURES 9–11. Specifically, one or the other polarizer is insertable into the light beam just as quickly as readings can be taken on the instrument, thereby eliminating the need for standardizing the system prior to each reading.

FIGURE 17 illustrates another quick-change arrangement for the polarizers. Here, the plate 50 carries the two polarizers 51, 52, said plate being pivotally mounted at 53 and normally biased to the illustrated position by a spring 54 secured between the plate arm 55 and a fixed point 56. In the apparatus, the plate arm 55 is accessible external of the apparatus housing for movement to the dotted line position by the operator. As is apparent, the polarizer 51 occupies a position in the light beam when the plate 50 is in the illustrated position, whereas the polarizer 52 is interposed into the light beam when the plate arm 55 is moved to the dotted line position.

Thus far, I have described apparatus utilizing two polarizers individually positionable into the light beam to obtain the two light energy readings. The polarization planes of these polarizers make equal angles, but of reverse sign, relative to the polarization axis of the analyser. FIGURE 18 illustrates an arrangement utilizing a single polarizer 60 mounted in a circular recess provided in a circular plate 61 and secured thereto by screws 62. Such plate is mounted for rotation about its center in the plane of the paper by any suitable means whereby the angular position of the polarizer plane of polarization may be set to a desired value by reference to a fixed scale 63 calibrated in angular degrees. Rotation of the plate 61 alters the phase angle $\alpha$ between the polarization planes of the polarizer and analyser, the plane of the latter being indicated by the arrow $A_n$ for reference. For example, by rotating the plate in a counter-clockwise direction, the polarizer plane of polarization may be set to the illustrated $P_1$ position, or $\alpha = +19°$, as established by the alignment of a cardinal line on the scale 63 with a line of the vernier scale 64 carried by the plate. An equal phase angle, but of opposite sign, is obtained by rotating the plate in a clockwise direction. Readings taken for these two orientations of the polarizer, relative to the analyser provide the light energy values $E_1$ and $E_2$.

OBTAINING LINEARITY OF RESPONSE BY MEANS OF SCALE DISTORTIONS

The characteristics of the aberration affecting the difference to the sum ratio have been analysed, hereinabove. It has been shown that the effect of aberration on the linearity of response of the system can be compensated for by applying a deviation angle to the initial plane angle in the polarizer-analyzer arrangements. There is now presented a method of aberration cancellation by means of instrument scale distortion which method offers greater simplicity in measurement interpretation when the value of the variable to be determined is obtained by means of a function not linear with respect to the said variable.

In the case of photo-electric polarimetry, the angle of optical rotation is known through a cosine square function yielding an electric current proportional to it as expressed by the equations:

$$I_1 = A_0^2 \cos^2(-\alpha + \theta) \text{ and } I_2 = A_0^2 \cos^2(\alpha + \theta) \quad (104)$$

Developing, in series, the functions of the current $I_1$ and $I_2$ we obtain $$I_1 = A_0^2 \cos(-\alpha+\theta) = A_0^2 \left[ \frac{1}{2}(1+\cos 2\alpha) + \sin 2\alpha.\theta \right.$$
$$\left. - \cos 2\alpha.\theta^2 \left(1-\frac{1}{3}\theta^2+\frac{2}{45}\theta^4\right) - \frac{2}{3}\sin 2\alpha.\theta^3 \left(1-\frac{1}{5}\theta^2+\frac{2}{105}\theta^4\right) \right] \quad (105)$$

$$I_2 = A_0^2 \cos(\alpha+\theta) = A_0^2 \left[ \frac{1}{2}(1+\cos 2\alpha) - \sin 2.\theta \ldots \right.$$
$$\left. -\cos 2\alpha.\theta^2 \left(1-\frac{1}{3}\theta^2+\frac{2}{45}\theta^4 \ldots\right) \right.$$
$$\left. \frac{2}{3}\sin 2\alpha.\theta^3 \left(1-\frac{1}{5}\theta^2+\frac{2}{105}\theta^4 \ldots\right) \right] \quad (106)$$

Using the notation $a = \tan \alpha$ and assuming that the current representative of the initial light energies $I_{01} = I_{02} = 100$ units, then;

$$A_0^2 = \frac{I_{01}}{\cos^2(-\alpha)} = \frac{I_{02}}{\cos^2 \alpha} = \frac{100}{\cos^2 \alpha}$$

the expression for $I_1$ and $I_2$ may be written in the simpler form:

$$I_1 = 100\left[1+2\alpha.\theta+a^2\left(1-\frac{1}{a^2}\right)\theta^2\left(1-\frac{1}{3}\theta^2 \ldots\right) \right.$$
$$\left. -\frac{4}{3}a\theta^3\left(1-\frac{1}{5}\theta^2 \ldots\right)\right] \quad (107)$$

$$I_2 = 100\left[1-2a\theta+a^2\left(1-\frac{1}{a^2}\right)\theta^2\left(1-\frac{1}{3}\theta^2+ \ldots\right) \right.$$
$$\left. +\frac{4}{3}a\theta^3\left(1-\frac{1}{5}\theta^2+ \ldots\right)\right] \quad (108)$$

The departure from linearity, or aberration, involves in both cases two main terms, respectively, of the second and third order when the optical rotation $\theta$ is small.

But, to satisfy the condition of linearity, the difference to the sum ratio must be made of functions $I'$ and $I''$ linear with respect to the angle $\theta$ and such as to yield:

$$r' = \frac{I' - I''}{I' + I''} = k\theta \quad (109)$$

The functions $I'$ and $I''$ may be written in the forms $$I' = b' + k'\theta = f_1(I_1) \quad (110)$$
$$I'' = b'' + k''\theta = f_2(I_2) \quad (111)$$

To determine the parametric coefficients of these new functions it is necessary to return to the conditions existing at the origin when the angle $\theta$ becomes 0. At that point, the following identities must be respected:

$$\frac{dr'}{d\theta} = k = \frac{dr}{d\theta} = 2a \quad (112)$$

Expressing the identity of the angular coefficients of the tangents at the origin, the condition of the equality of the tangents at the origin also must be simultaneously respected for the functions $I'$ and $I_1$ as well as for $I''$ and $I_2$. Thus, the relationship for $\theta = 0$ $$dI' = k'd\theta = dI_1 = I_0 2ad\theta \quad (113)$$
$$dI'' = k''d\theta = dI_2 = I_0 2ad\theta \quad (114)$$

A third condition, derived from identical standardization, stipulates that the initial light energies for $\theta = 0$ are equal between themselves and thus yields:

$$I_0' = I_{01} = I_0'' = I_{02} = \frac{A_0^2}{\cos^2 \alpha} \quad (115)$$

From these different relationships one obtains:

$$b' = b'' = \frac{A_0^2}{\cos^2 \alpha} = I_0$$
$$k' = -k'' = I_0 2a$$
$$k = 2a$$

and the final expressions:

$$I' = I_0 + I_0 2a\theta \quad (116)$$
$$I'' = I_0 - I_0 2a\theta \quad (117)$$

Therefore, the functions $f_1(I_1)$ and $f_2(I_2)$ become fully explicited in their respective final form:

$$I' = I_1 - I_0\left[a^2\left(1-\frac{1}{a^2}\right)\theta^2\left(1-\frac{1}{3}\theta^2 \cdots\right)\right.$$
$$\left. -\frac{4}{3^a}\theta^3\left(1-\frac{1}{5}\theta^2 \cdots\right)\cdots\right] \quad (118)$$

$$I'' = I_2 - I_0\left[a^2\left(1-\frac{1}{a^2}\right)\theta^2\left(1-\frac{1}{3}\theta^2 \cdots\right)\right.$$
$$\left. +\frac{4}{3^a}\theta^3\left(1-\frac{1}{5}\theta^2 \cdots\right)\cdots\right] \quad (119)$$

Figure 19:
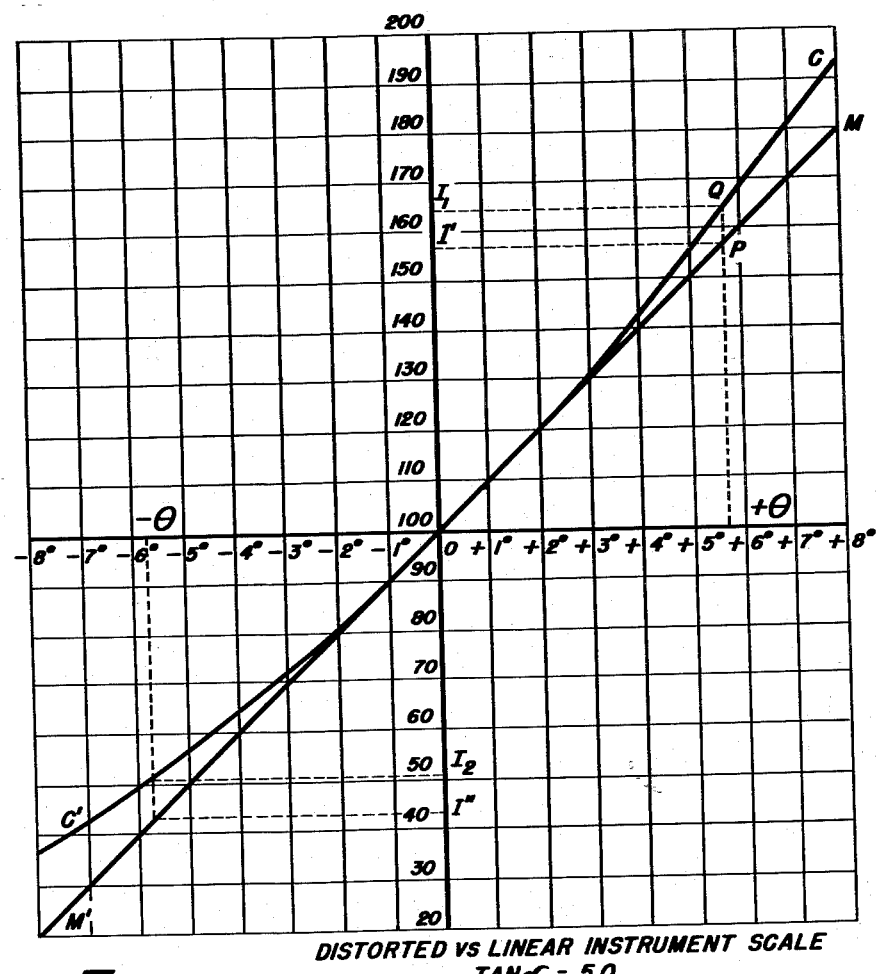
FIGURE 19 is a graph showing a distorted vs. a linear instrument scale, the former being modified to cancel out the effects of aberration.

For any selected angle $\theta$, an unequivocal single-valued correspondence exists between the linear function $I'$ and its complex counterpart $I_1$. Hence, if the normal graduation of the instrument scale, proportional to the current $I_1$ is replaced by scale divisions proportional to $I'$ the difference to the sum ratio of the readings becomes linear with respect to the optical angular rotation $\theta$. The correlation between $I'$, $I_1$ and $I''$, $I_2$ is represented by the graph, FIGURE 19, where the curve C'OC representative of the function $I_1$ has been traced passing through the intersection of the coordinate axes. The angular coefficient of the tangent to this curve at the point O is equal to the one of the straight line M'OM representative of the function $I'$ passing also at the same point O.

For a given optical rotation $\theta$ the straight line parallel to the ordinates axis and passing through the value $\theta$ of the abscissa axis intersects the straight line M'OM at P and the curve C'OC at Q. The values of the ordinates of these two points P and Q, respectively, represent the functions $I'$ and $I_1$ of the angle $\theta$.

The correspondence of the $I_2$ scale versus the normal $I_1$ scale is established readily by means of the Equations 116 and 107. The angle $\theta$, which corresponds to a specific value $I'$, is given by:

$$\theta = \frac{I' - I_0}{I_0 2a}$$

Transferring this angle into expression 107 yields the value $I_1$ of the linear scale.

Taking the set of values:

$$\tan \alpha = a = 5 \text{ and } I_0 = 100$$

we obtain the following correspondence between $I'$ and $I_1$

| $\theta \rightarrow$ | 0.00 | 0.01 | 0.02 | 0.03 | 0.04 | 0.05 | 0.06 | 0.07 | 0.00 |
|---|---|---|---|---|---|---|---|---|---|
| $I' \rightarrow$ | 100.000 | 110.000 | 120.000 | 130.000 | 140.000 | 150.000 | 160.000 | 170.000 | 180.008 |
| $I_1 \rightarrow$ | 100.000 | 110.239 | 120.954 | 132.141 | 143.795 | 155.911 | 168.485 | 181.512 | 194.986 |
| $\theta \rightarrow$ | −0.00 | −0.01 | −0.02 | −0.03 | −0.04 | −0.05 | −0.06 | −0.07 | −0.08 |
| $I' \rightarrow$ | 100.000 | 90.000 | 80.000 | 70.000 | 60.000 | 50.000 | 40.000 | 30.000 | 20.000 |
| $I_1 \rightarrow$ | 100.000 | 90.240 | 80.965 | 72.177 | 63.880 | 56.078 | 48.773 | 41.969 | 35.628 |

Figure 20:
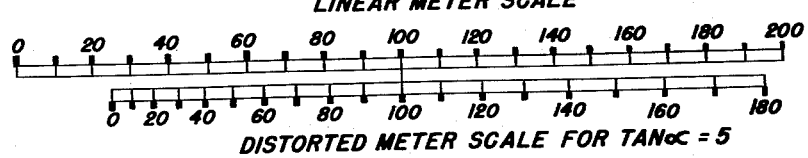
FIGURE 20 illustrates representative instrument scales, one scale being linear and the other modified for aberration correction.

The actual linear and distorted instrument scales are shown in FIGURE 20.

SUMMARY—ADVANTAGES OF DISCLOSED METHODS

In summary, the three methods of polarimetric analysis hereinclosed are:

*Method 1.*—The simple ratio method wherein the optical relation angle $\theta$ is obtained from the relationship:

$$\frac{E_1}{E_2} = 1 + 4\tan\alpha.\theta + 8\tan^2\alpha.\theta^2 + \frac{4}{3}\tan\alpha(1+9\tan^2\alpha)\theta^3$$

where:
$\alpha$ = the phase angle between the polarizer and analyser,
$E_1$ and $E_2$ = the measured energy of the light beam emerging from the analyser for the respective phase angles $\alpha$ and $-\alpha$, and
$\theta$ = radians.

For very small optical rotation angles, less than about 0.5 radian, the angle $\theta$ is obtained directly from the ratio, $$\theta = \frac{E_1 - E_2}{4E_2 \tan\alpha}$$

*Method 2.*—The ratio minus its reciprocal ratio method wherein the angle $\theta$ is obtained from the relationship;

$$\frac{E_1}{E_2} - \frac{E_2}{E_1} = 8\tan\alpha.\theta + \frac{8}{3}\tan\alpha(1+9\tan^2\alpha)\theta^3$$

which, for very small optical rotation angles reduces to:

$$\theta = \frac{E_1^2 - E_2^2}{E_1 E_2 8 \tan\alpha}$$

*Method 3.*—The difference to the sum ratio method wherein the angle $\theta$ is obtained from the relationship:

$$\frac{E_1 - E_2}{E_1 + E_2} = 2\tan\alpha.\theta - 2\tan^3\alpha\left(1 - \frac{1}{3\tan^2\alpha}\right)\theta^3$$

which, for very small optical rotation angles reduces to:

$$\theta = \frac{E_1 - E_2}{E_1 + E_2} \times \frac{1}{2\tan\alpha}$$

Since the disclosed methods permit the use of high amplification factors for determining the optical rotation angle even dark colored solutions may be analysed. The decisive advantage of these methods over all known optical methods and that of Crumpler becomes evident when we consider the case of either colored or turbid media. Polarimetric analysis requires that a certain amount of light energy passes through the substance under analysis. In a practical sense, the proper functioning of both optical and photoelectric polarimeters depends upon a light transmission factor of at least one (1) percent. This condition, general for all instruments, can be expressed by the Lambert and Beers law, $$\frac{E_1}{E_2} = e^{-kcl} = 0.01$$

where:

$E_1$ = the energy of the light beam as it strikes the substance under test,
$E_2$ = the energy of the light beam as it emerges from the substance,
$e$ = 2.718 (base of common logarithm),
$k$ = coefficient of absorption of the substance,
$l$ = distance the light beam travels through the substance, in centimeters, and
$c$ = the concentration of the substance.

Each type of instrument is readily characterized by the light path length $l$ necessary for its functioning; this length being 10 centimeters for both optical and Crumpler instruments since they do not benefit from the amplification factor resulting from large phase angles between polarizer and analyser.

Comparing those different polarimetric methods on the basis of equal sensitivity $$\frac{dE}{E}$$

we may write the successive equalities, $$\frac{dE}{E} = 2\tan\alpha_1 \times \Delta\theta_1 = 2 \times \Delta\theta_2 = \Delta\theta_3$$

where the subscripts 1, 2 and 3 are respectively indicative of my method, Crumpler's method and the optical polarimeters.

For the same coefficient of optical rotary power ($\theta$) this general equality leads to the new one:

$$\frac{dE}{E} = 2 \tan \alpha_1 \frac{(\theta)l_1}{l_0} = \frac{2(\theta)l_2}{l_0} = \frac{(\theta)l_3}{l_0}$$

where $l_1$, $l_2$ and $l_3$ are the necessary respective light path lengths in the different systems, while $l_0$ represents the standard length corresponding to the rotary power ($\theta$).

Therefore, the light path length $l_1$ of my method can be compared against the other ones, and we obtain $$l_1 = \frac{l_2}{\tan \alpha_1} = \frac{l_3}{2 \tan \alpha_1} = \frac{l_0}{2 \tan \alpha_1}$$

Writing the transmission equations for the different systems we obtain:

$$T_1 = e^{-kcl_1} \quad T_2 = e^{-kcl_2} \quad T_3 = e^{-kcl_3}$$

or $$T_1 = e^{-kcl_1} \quad T_2 = e^{-kcl_1 \tan \alpha_1} \quad T_3 = e^{-kcl_1 2 \tan \alpha_1}$$

with the condition $l_1 2 \tan \alpha_1 = l_0$

These last relationships are equivalent to:

$$T_1 = e^{-kcl_1} \quad T_2 = (T_1)^{\tan \alpha_1} \quad (T_3 = (T_1)^{2 \tan \alpha_1}$$

Selecting a still manageable transmission of $T_1 = 0.01$ or one percent and a tangent $\alpha$ of 5 we obtain:

$$T_1 = 0.01 \quad T_2 = 1 \times 10^{-10} \quad T_3 = 1 \times 10^{-20}$$

It is well evident that the transmissions $T_2$ and $T_3$ are equivalent to the total opacity of the medium and no measurement of the angle of rotation can be obtained.

If the material is still more opaque and yields a transmission of $T_1' = 0.01$ under a light path length of one millimeter, then a tangent $\alpha$ of 50 will be required to satisfy the condition of constant sensitivity to optical rotation:

$$0.1 \times 2 \times 50 = 10 \text{ cms.}$$

and the corresponding transmissions $T_2$ and $T_3$ become respectively:

$$T_1 = 0.01 = 1 \times 10^{-2} \quad T_2 = 1 \times 10^{-100} \quad T_3 = 1 \times 10^{-200}$$

These staggering values are well indicative of the possibilities offered by the new method.

Still further, the disclosed methods permit compensation of the aberring factor, to such an extent that it becomes negligible, by the use of an initial deviation angle $e$ applied to the phase angle between the polarizer and analyser, such deviation angle being given by the relationship;

$$e = \left[ \frac{1 - \frac{1}{3 \tan^2 \alpha}}{1 + \frac{1}{\tan^2 \alpha}} \right] \theta_0$$

$\alpha$ = the phase angle between polarizer and analyser, and
$\theta_0$ = the angular rotation for which the deviation must be cancelled.

Such phase angle shifting leads to a sensitivity of the order of $1 \times 10^{-12}$ radians, which is entirely out of reach by prior methods.

Still further, since the phase angles between the polarizer-analyser arrangements remain fixed, the practice of the methods does not depend upon a high accuracy of angular positioning of the planes of polarization of the polarizer and analyser, relative to each other, and does not depend upon the operator, as is the case with the Crumpler method. This feature is of practical importance when it is realized that precise polarimetric analysis demands that the phase angle between polarizer and analyser must be respected to better than 0.00003 radian.

From the above detailed description of the method and apparatus, those skilled in this art will find no difficulty in adapting both the method and apparatus to specific cases of analysis either by the sampling technique, or by a continuous process technique with or without a recording function. The methods disclosed possess the necessary requirements for adaptation to stream analysis for controlling or monitoring chemical processes. While the description has been directed primarily to a system wherein the light beam passes through a solution under test, the method is not restricted to such application. It is apparent that a transparent solid substance, such as quartz, glass, etc., is subject to polarimetric analysis by the disclosed methods. Also, in the case of a normally opaque material, such material may be deposited upon a glass plate to a thickness which will transmit light therethrough and the disclosed methods remain valid for the determination of the angular rotation function of the substance.

Having now given a detailed disclosure of the novel methods of polarimetric analysis, and apparatus useful for the practice of the methods, such variations and modifications as may be made by those who are skilled in this art are intended to fall within the scope and spirit of the invention as set forth in the following claims.

I claim:

1. A method of determining the angular rotation $\theta$ of the plane of polarization of plane polarized light by a substance, which angular rotation falls within a known range of $\theta = 0$ to $\theta = \theta_m$ radians; said method comprising passing a polarized light beam onto the substance and through an analyser, the polarizing planes of the analyser and the light beam being angularly offset at a first preselected angle of $\alpha + e$, where $e$ is determined from the relationship, $$e = \frac{1 - \frac{1}{3 \tan^2 \alpha}}{1 + \frac{1}{\tan^2 \alpha}} \theta_m, \text{ in radians}$$

alternately changing the angle between the polarizing planes of the analyser and light beam from the said first preselected angle $\alpha + e$ to a second angle $-\alpha + e$, thereby resulting in two distinct light beams emerging from the analyser; and measuring the ratio of the energies of the emerging light beams to determine the extent to which the substance rotates the plane of polarization of plane polarized light.

2. A method of determining the angular rotation $\theta$ of the plane of polarization of plane polarized light by a substance, which angular rotation falls within a known range of $\theta = 0$ to $\theta = \theta_m$ radians, said method comprising passing a polarized light beam onto a substance and through an analyser, the polarizing planes of the analyser and light beam being angularly offset at a first preselected angle of $\alpha + e$, where $e$ is determined from the relationship, $$e = \frac{1 - \frac{1}{3 \tan^2 \alpha}}{1 + \frac{1}{\tan^2 \alpha}} \theta_m, \text{ in radians}$$

alternately changing the angle between the polarizing planes of the analyser and light beam from the said first preselected angle $\alpha + e$ to a second angle $-\alpha + e$, thereby resulting in two distinct light beams emerging from the analyser; measuring the difference $E_1 - E_2$ of the energies of the emerging light beams; measuring the sum $E_1 + E_2$ of the energies of the emerging light beams, the ratio of the measured energies determining the extent to which the substance rotates the plane of polarization of plane polarized light.

References Cited in the file of this patent

UNITED STATES PATENTS

| | | |
|---|---|---|
| 2,583,186 | Mueller | Jan. 22, 1952 |
| 2,731,875 | Gould | Jan. 24, 1956 |
| 2,766,652 | Stanton | Oct. 16, 1956 |
| 2,795,166 | Noskowicz | June 11, 1957 |
| 2,829,555 | Keston | Apr. 8, 1958 |